US008255834B2

(12) United States Patent
Chinn et al.

(10) Patent No.: US 8,255,834 B2
(45) Date of Patent: Aug. 28, 2012

(54) DISPLAYING A SET OF DATA ELEMENTS

(75) Inventors: Robert M. Chinn, Menlo Park, CA (US); Pavel Cisler, Los Gatos, CA (US); Patrick E. McClaughry, Sunnyvale, CA (US); Marcel M W A van Os, San Francisco, CA (US); Bas Ording, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 871 days.

(21) Appl. No.: 11/226,454

(22) Filed: Sep. 15, 2005

(65) Prior Publication Data
US 2006/0250834 A1    Nov. 9, 2006

Related U.S. Application Data

(60) Provisional application No. 60/674,306, filed on Apr. 25, 2005.

(51) Int. Cl.
G06F 17/21 (2006.01)
G06F 17/24 (2006.01)
G06F 3/048 (2006.01)

(52) U.S. Cl. .................. 715/853; 715/207; 715/254

(58) Field of Classification Search .................. 715/246, 715/254, 815, 207, 853
See application file for complete search history.

(56) References Cited

U.S. PATENT DOCUMENTS

| 6,236,400 | B1 * | 5/2001 | Guerrero | 715/841 |
| 6,249,782 | B1 * | 6/2001 | Day et al. | 1/1 |
| 6,624,831 | B1 * | 9/2003 | Shahine et al. | 715/815 |
| 2003/0222923 | A1 * | 12/2003 | Li | 345/815 |
| 2005/0102634 | A1 * | 5/2005 | Sloo | 715/823 |
| 2005/0149977 | A1 * | 7/2005 | Nakamura et al. | 725/105 |
| 2006/0117255 | A1 * | 6/2006 | Seeler | 715/520 |

* cited by examiner

*Primary Examiner* — Namitha Pillai
(74) *Attorney, Agent, or Firm* — Fish & Richardson P.C.

(57) ABSTRACT

A set of elements, such as, for example, a path, a directory list, a playlist, and a listing of information associated with a file or a song, may be truncated so that a partial set may be generated and displayed. The truncation may be performed in an intelligent manner to produce a meaningful truncated portion. Such a partial set may be beneficial when the space allotted for display of the set is small to begin with or is reduced. In one implementation, a display size of a set is compared with a size of a display area. A data element is selected based on the comparison, and a display space size is determined for the selected data element. A truncated, yet meaningful, portion is determined for the selected data element, the portion fitting within the display space size.

17 Claims, 28 Drawing Sheets

DISPLAYING A SET OF DATA ELEMENTS

CROSS-REFERENCE TO RELATED APPLICATIONS

This application claims priority from U.S. provisional application Ser. No. 60/674,306, filed on Apr. 25, 2005. The contents of the prior application are incorporated herein by reference.

TECHNICAL FIELD

This disclosure relates to data processing.

BACKGROUND

Lists of elements can be displayed in their entirety, for example on a display of a computing system. When the space available for displaying a list is reduced, however, it may not be possible to display all of the elements of the list in their entirety. In such cases, the computing system typically displays the list in a reduced form where often important information that a user desires to view may be eliminated.

SUMMARY

In a disclosed implementation, in response to a reduced amount of display space, particular elements from a set are identified as containing less important information. These elements (the "less important elements") containing less important information are displayed less preferentially by reducing the space allotted to each of the less important elements. Additionally, each of the less important elements is meaningfully truncated, and the truncated elements are displayed in the allotted spaces.

According to one general aspect, a set is received that includes two or more data elements, and information is received describing a size of an area in which the set is to be displayed. A display size of the set is determined and compared with the size of the area. One or more of the data elements are selected based on a result obtained from the comparing and based on relative importance of the data elements. One or more display space sizes are determined based on the information received, each of the one or more display space sizes corresponding to one of the one or more selected data elements. A truncated portion is determined for each of the one or more selected data elements, the one or more portions fitting within the corresponding display space size.

Implementations may include one or more of the following features. For example, a part of the set to display may be determined, the part including the truncated portion of each of the one or more selected data elements, and the part of the set may be displayed in the area. The received information may indicate that the area is sized such that not all of the two or more data elements can be displayed completely within the area.

The relative importance of the data elements may be based on a relationship between the data elements, relative positions of the data elements in a display, a hierarchy among the data elements, and categories represented by the data elements. The determined display space sizes may be smaller than a full size of the corresponding selected data element and smaller than an allowable display space size for the corresponding selected data element. Determining one or more display space sizes may include, for each display space size to be determined, (i) determining the full size of a selected data element, and (ii) setting the corresponding display space size equal to approximately a predetermined percentage of the full size of the selected data element.

Determining a truncated portion for the one or more selected data elements may include, for each of the one or more selected data elements, eliminating a predetermined percentage of a textual description of the selected data element. The predetermined percentage may be the same for each of the selected data elements. The set may relate to a song from a playlist, and the data elements may each include information about the song. The set may relate to a path of an object on a computing device, and the data elements may each include a path element.

According to another general aspect, a set is accessed that includes two or more set entries, and information is accessed describing a size of an area in which the set is to be displayed. A display size of the set is determined and compared with the size of the area. One or more of the set entries is selected based on a result obtained from the comparing and based on relative importance of the data elements. A size of a display area is determined for each of the one or more selected set entries, the size being determined based on the information accessed. A truncated portion is determined for each of the one or more selected set entries, the one or more portions fitting within the corresponding determined display area size.

According to another general aspect, a path is received that includes two or more path elements, and a path element is selected based on relative importance of the path elements. A truncated portion is determined for the selected path element to display when displaying the path.

Implementations may include one or more of the following features. For example, information may be received describing a size of an area in which the path is to be displayed. The received information may indicate that the area is sized such that not all of the two or more path elements can be displayed completely within the area. A display size of the path may be determined. A part of the path to display may be determined, the part including the truncated portion of each of the selected path elements, and the part of the path may be displayed in the area.

Determining a truncated portion may include reducing a textual portion of the selected data element by a predetermined percentage. An indication may be provided in the truncated portion indicating that the selected path element has been truncated. A second path element may be selected based on relative importance of the path elements, and a truncated, yet meaningful portion may be determined for the second selected path element by reducing a textual portion of the selected data element by the predetermined percentage. The relative importance may be based on a position of the path element in the path.

Selecting a path element may include selecting an interior path element because of a relatively lower importance of the interior path element as compared to a non-interior path element. A root path element may be selected after truncating the interior path element, and the root path element may be truncated. A parent path element may be selected after truncating the root path element, and the parent path element may be truncated.

According to another general aspect, an apparatus includes a mechanism for accessing a path that includes two or more path elements. The apparatus also includes a mechanism for identifying a path element based on relative importance of the path elements. The apparatus further includes a mechanism for identifying a truncated part of the selected path element to display when displaying the path.

According to another general aspect, a set of two or more data elements is accessed, and a particular data element from the set is truncated. The truncated data element and at least a portion of the rest of the set is displayed in an electronic display. A user input to hover over the truncated data element is accepted. The truncated data element is expanded in the electronic display in response to accepting the user input, such that the data element is displayed.

According to another general aspect, a set of data elements is accessed, the set of data having been generated in response to a user request for information, and the set including two data elements that each have a text portion. The text portion of a first of the two data elements is truncated to produce a truncated text portion. The truncated text portion is displayed concurrently with the text portion of a second of the two data elements. A user input is received while displaying concurrently both the truncated text portion and the text portion of the second of the two data elements, and the user input represents a request for a display of all of the text portion of the first of the two data elements. All of the text portion of the first of the two data elements is displayed concurrently with the display of the text portion of the second of the two data elements.

According to another general aspect, an indication is received of a particular electronic file, and a path for the particular electronic file is determined back to a designated folder. The path is rooted in the designated folder. The path is displayed electronically as rooted in the designated folder.

According to another general aspect, an indication of a particular electronic file is received, and a path is determined for the particular electronic file. Path element separators are inserted between path elements of the determined path. The path is displayed, including the path element separators, in a path display area. A user input to reduce the path display area is received. The path element separators are removed from the display of the path in response to receiving the user input.

According to another general aspect, indicators of multiple electronic files are displayed, and a user selection is received of indicators of two of the multiple electronic files. Paths are determined for the two electronic files, and the paths are compared. Based on a result obtained during the comparing, an indication is displayed of whether the two paths are the same.

Implementations may include one or more of the following features. For example, the path of the first electronic file may match the path of the second electronic file, and displaying the indication may include displaying a common path. A user selection may be received of an indicator of a third of the multiple electronic files. A path of the third electronic file may be determined and compared with the path of the first electronic file. Based on a result obtained during comparing the path of the third electronic file, an indication may be displayed of whether the path of the third electronic file and the path of the first electronic file are the same.

According to another general aspect, an indication of a particular electronic file is received. A path is determined for the particular electronic file, and the path is displayed electronically. While displaying the path, an indication is accessed that the path for the particular electronic file has changed. An updated path is determined for the particular electronic file, and the updated path for the particular electronic file is displayed electronically.

According to another general aspect, a set is received that includes two or more data elements. A first data element, having a first size, is selected from the two or more data elements. A second data element, having a second size, is selected from the two or more data elements. A truncated first size is determined, the truncated first size being based on a percentage of the first size. A truncated second size is determined, the truncated second size being based on a percentage of the second size that is the same as the percentage of the first size. A truncated portion of the first data element is determined, and the truncated portion of the first data element has a size such that the truncated portion of the first data element is displayable in the truncated first size. A truncated portion of the second data element is determined, and the truncated portion of the second data element has a size such that the truncated portion of the second data element is displayable in the truncated second size.

According to another general aspect, one or more data elements are selected based on relative importance of the data elements, and a truncated portion is determined for each of the one or more selected data elements.

According to another general aspect, one or more data elements are selected, and a truncated portion is determined for each of the one or more selected data elements. The one or more truncated portions each have a different size. The one or more truncated portions may each fit within a corresponding display space size.

The disclosed implementations may allow a set, for example, a list, of elements to be displayed in a manner providing a user with, for example, the important information from the set. This may allow a user to find and use desired information quickly and efficiently, contributing to a positive user experience. Further, to the extent the important information is displayed using a small amount of space, then a space savings may be realized which may allow other information to be displayed in the unused space. The set may represent a variety of types of information, including, for example, path information, file information, and song information.

The above general aspects may be implemented, for example, using a method and an apparatus. An apparatus may include one or more computer readable media having instructions stored thereon and configured to result in one or more of the general aspects being performed. An apparatus may include one or more pieces of structure for performing operations in one or more of the general aspects. A method may include the operations that are performed, or the operations that structure is configured to perform, in one or more of the general aspects.

The details of one or more implementations are set forth in the accompanying drawings and the description below. Other features will be apparent from the description and drawings, and from the claims.

DETAILED DESCRIPTION

In one implementation, a search utility in an operating system of a personal computer displays both the name of an item (for example, a file or a folder) that satisfies the search terms, and a path description for the item. The path description is displayed in its entirety if space allows. However, if space does not allow, then the search utility displays only a portion of the path description. As the allotted space is progressively reduced, the search utility moves through a series of path display configurations in an attempt to display important path information in the space allotted.

In the above implementation, the search utility uses a number of rules to attempt to retain the most important information in any path display. For example, the search utility first eliminates information associated with interior path elements between the root and the parent of the item. The information is eliminated by shortening the names of the interior path elements, and, in one implementation, each interior path element is shortened by the same percentage. In one implementation, the search utility then proceeds by first eliminating space allotted to the root name of the path and, second, eliminating space allotted to the parent name of the path.

We now describe a specific implementation, and we include a description of a significant number of details to provide clarity in the description. The specific implementation involves displaying the path of, for example, a search result in a search utility. In this specific implementation, the path is displayed in a single line. As the length of that line is increased or decreased, by a user resizing the search utility window for example, the display of the path is modified to attempt to fit the display of the path into the line. The modification of the path includes truncating portions of the path, particularly textual portions, in a specified order and in a meaningful way. However, as one of ordinary skill appreciates, and as we discuss throughout the document, particularly after presenting the specific implementation, many variations are envisioned. Such variations relate to, for example, modifying the details of how the path is displayed in a search utility, displaying a path in an analogous manner in a variety of other utilities or applications, and adapting the disclosed features to display a variety of other sets of data in addition to paths.

Figure 1:
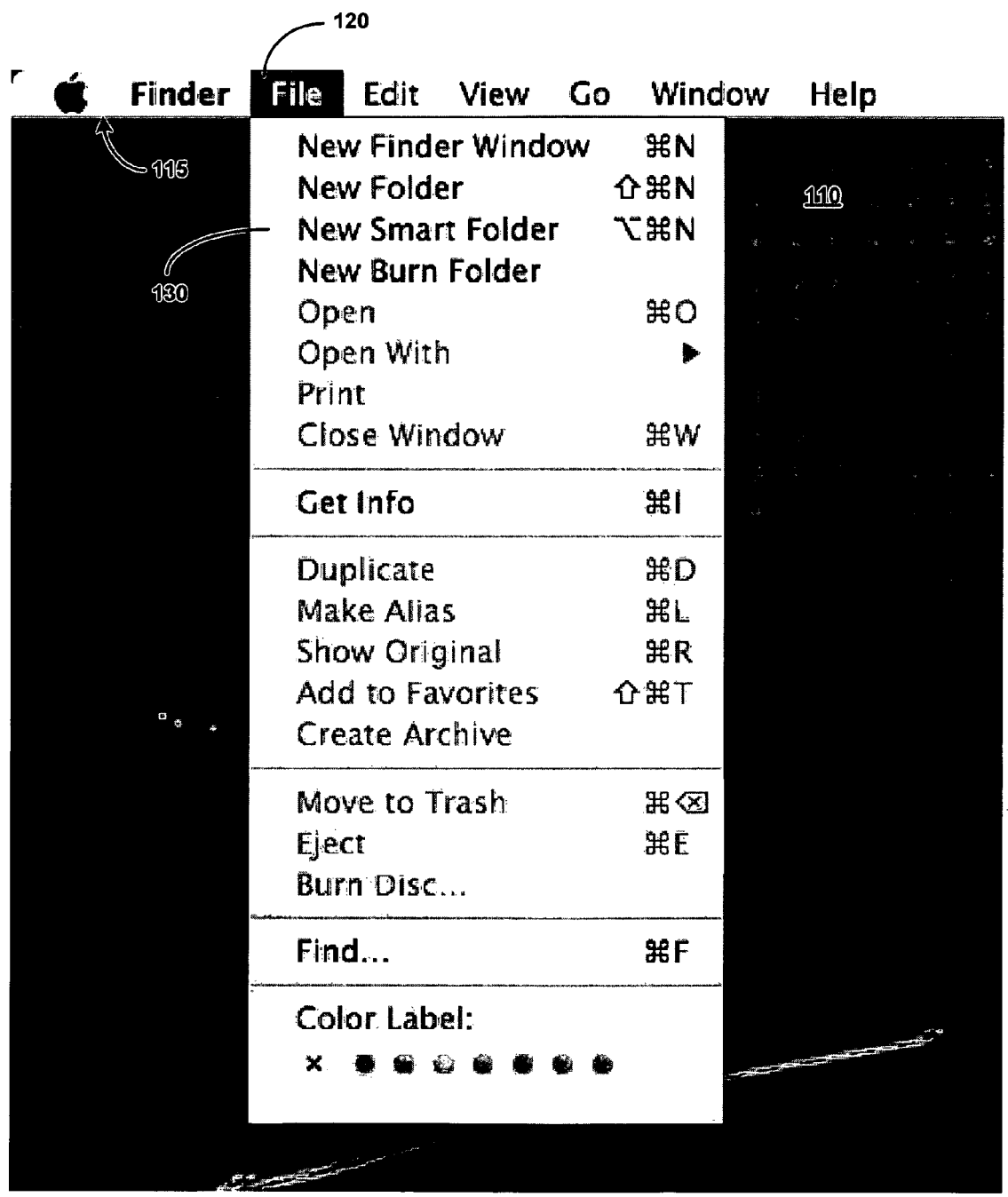
FIG. 1 is a screenshot of a File menu.
Figure 2:
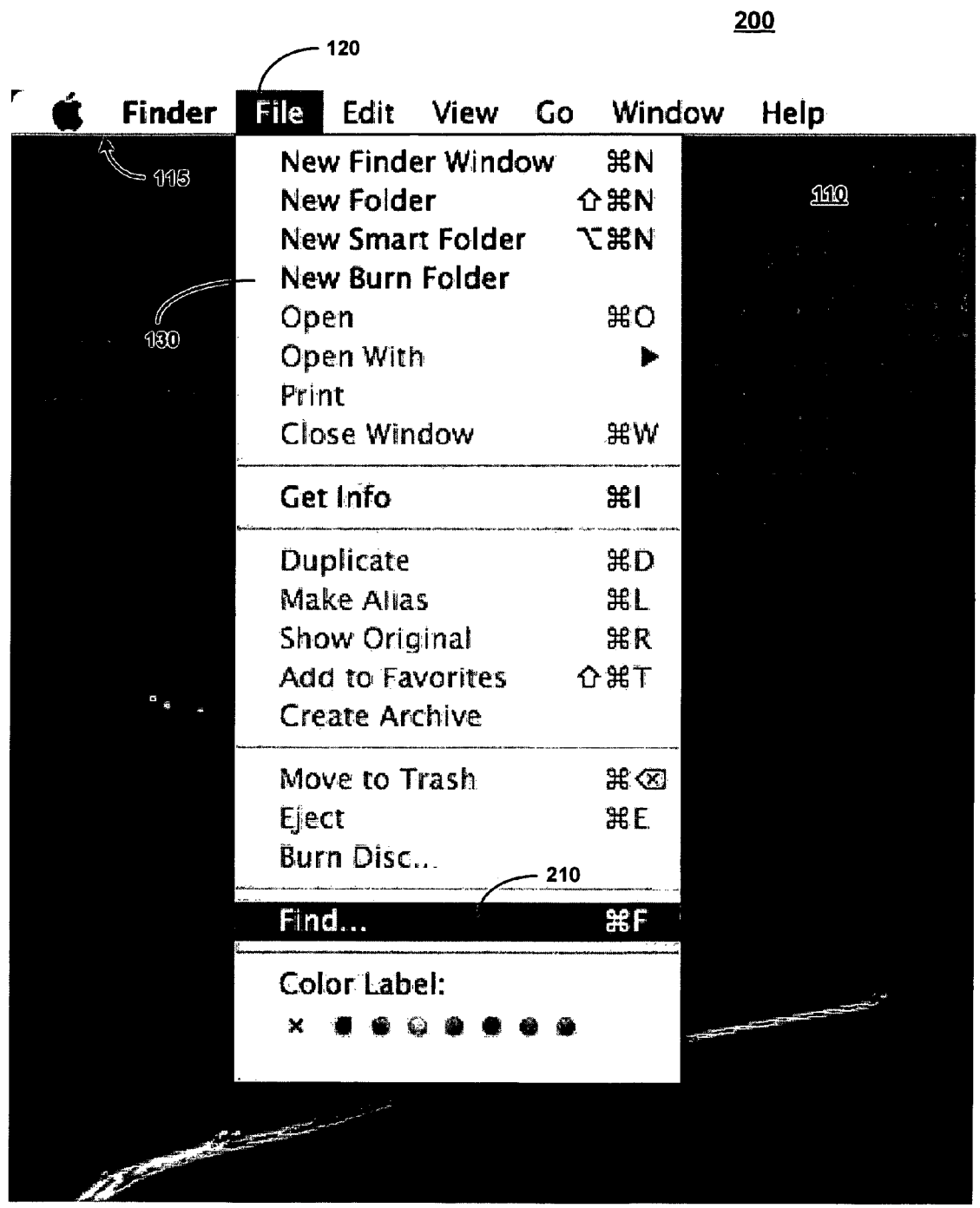
FIG. 2 is a screenshot showing selection of a Find command from the File menu of FIG. 1.
Figure 3:
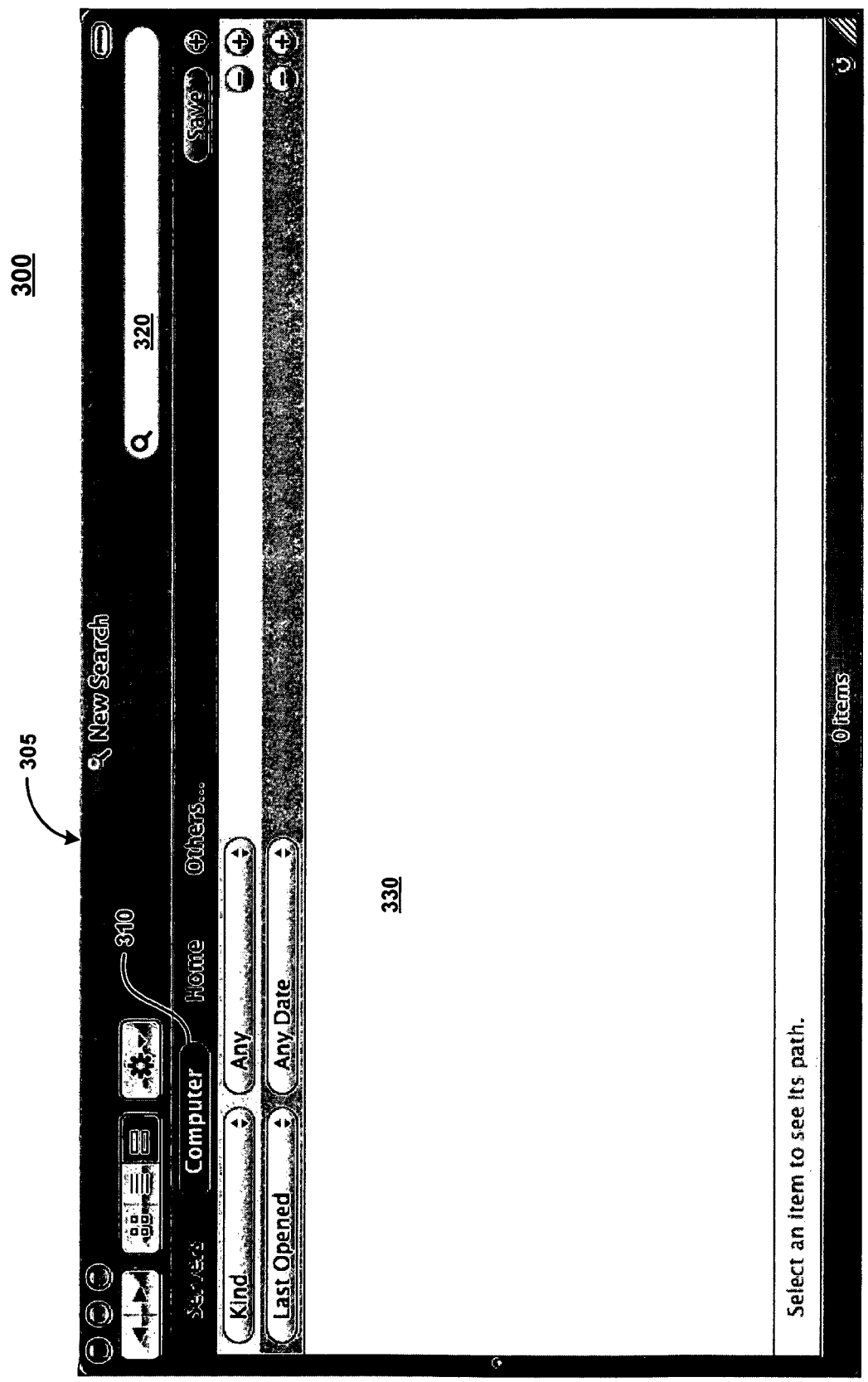
FIG. 3 is a new search window.

FIGS. 1-3 illustrate the selection of a search utility that provides a path description for search results. The search utility may be provided by, for example, an operating system running on a personal computer.

Referring to FIG. 1, a screenshot 100 shows a computer screen displaying a "desktop" 110. Desktop 110 shows a command bar 115, such as Finder's menu bar in the user interface provided by the MAC OS X operating system from Apple Computer, Inc. of Cupertino, Calif. Command bar 115 includes a File command 120 that is selected. Selecting File command 120 causes an associated pull-down File menu 130 to be displayed. Referring to FIG. 2, a screenshot 200 shows that pull-down File menu 130 includes menu items such as a Find command 210 that is selected.

Referring to FIG. 3, a screenshot 300 shows a new Search window 305 that is created when Find command 210 is selected. New Search window 305 shows that the scope of the new search is selected as a Computer 310, indicating that Computer 310 will be searched. Computer 310 may refer, for example, to a computer that is running the search utility and producing New Search window 305, or to a remote computer. New Search window 305 includes a search terms window 320 and a search results window 330, both of which are empty. The scope can extend beyond the local computer, for example, using a network connection. A path to a search result also may extend outside of the local computer.

Figure 4:
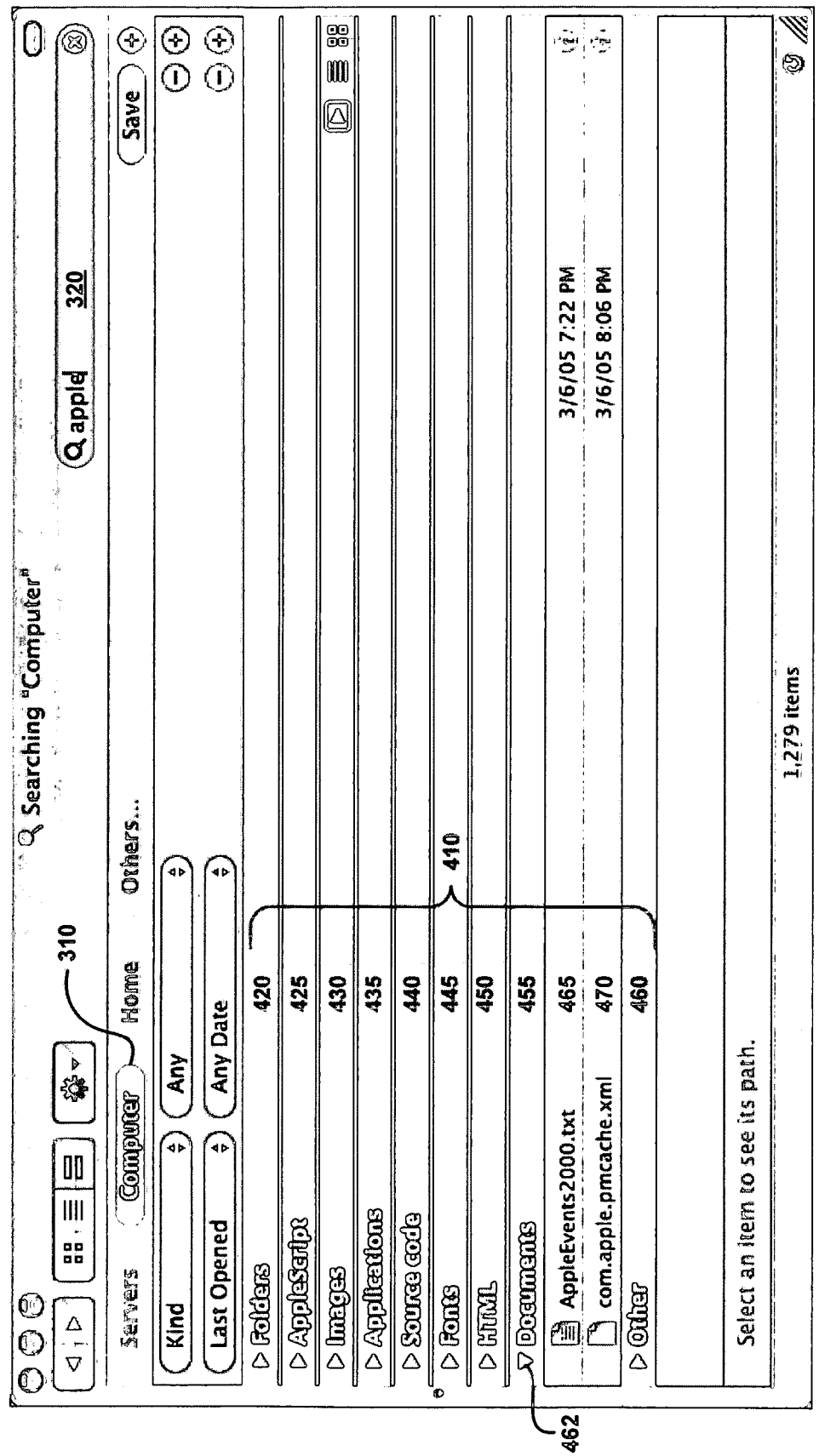
FIG. 4 is a search results window showing various groups.

Referring to FIG. 4, a screenshot 400 shows that the search term "apple" is entered in search terms window 320, and that a search of computer 310 for the search term "apple" produces a list of search results 410. Search results may be organized in various manners, such as, for example, by alphabetical order, size, date of creation, authoring application, file format, and file type. In one implementation, search results 410 is organized by file types referred to as groups. Various file groups are listed in search results 410, including a Folders group 420, an AppleScript group 425, an Images group 430, an Applications group 435, a Source Code group 440, a Fonts group 445, an HTML ("hyper-text markup language") group 450, a Documents group 455, and an Other group 460. Further examples of groups include contacts, directories, e-mail, facsimiles, music, movies, portable document format ("PDF") documents, presentations, really simple syndication ("RSS") articles, and system preferences.

Each of the groups displayed in search results 410 includes an indicator (for example, an arrow), such as arrow 462 for Documents group 455, that can be used to collapse or expand the group. Arrow 462 points down, indicating that the search results within Documents group 455 are expanded. By expanding Documents group 455, all of the search results that are categorized in Documents group 455 are displayed. Documents group 455 includes two search results, as shown, including an "AppleEvents2000.txt" document 465 and a "com.apple.pmcache.xml" document 470.

Figure 5:
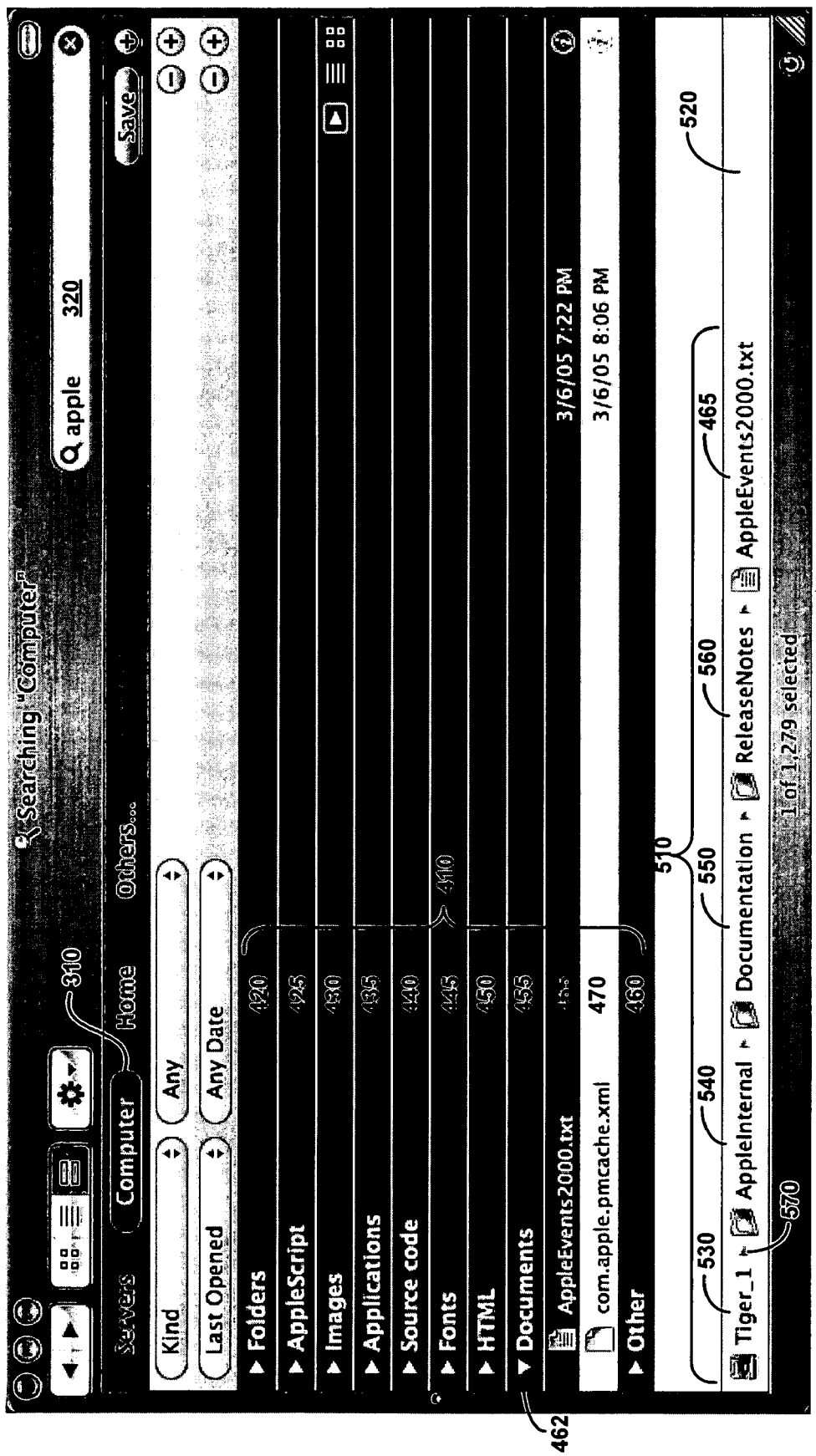
FIG. 5 is a search results window showing a path.

Referring to FIG. 5, a screenshot 500 shows that "AppleEvents2000.txt" document 465 is selected. The selection of a search result causes a search results path ("SRP") 510 for the search result to be displayed in an SRP field 520. SRP 510 is displayed for a selected search result regardless of whether the search results are displayed in groups, as in screenshot 500, or in some other manner, such as, for example, being displayed alphabetically.

SRP 510 includes five path elements, described from left to right as follows. The first path element is Tiger_1 referred to as a root path element 530, or simply as root 530. The next two path elements are AppleInternal and Documentation which are referred to as interior path elements 540 and 550, respectively. The next path element is ReleaseNotes, which is referred to as a parent path element 560, or simply as parent 560. The last path element is "AppleEvents2000.txt," which is the actual search result document 465. Each of the path elements is shown separated by a path element separator, such as a path element separator 570. As the names of the path elements suggest, SRP 510 describes a standard path for document 465, and a user may use the information in SRP 510 to navigate through a directory structure to find document 465. The provision of SRP field 520 is particularly useful in light of the fact that search results 410 is organized by groups, which does not necessarily reveal the location of each of the search results.

Root 530 identifies Tiger_1 as the root path element of SRP 510. Tiger_1 is a volume of Computer 310, but an SRP does not need to be rooted in a volume. SRPs may be rooted in, for example, a particular folder, a user's Home, and even the Trash.

Figure 6:
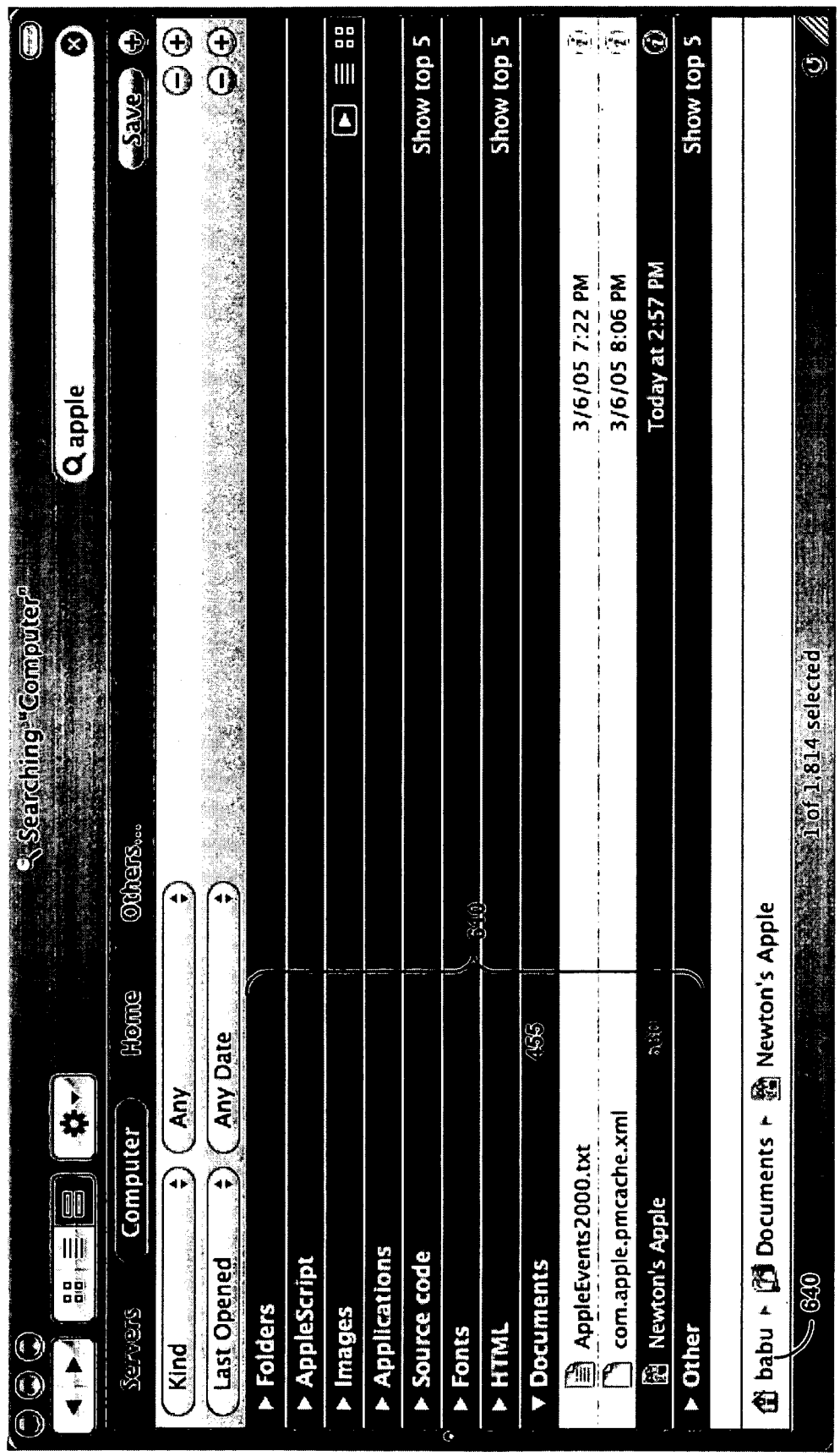
FIG. 6 is a search results window showing a path rooted at a home location.

Referring to FIG. 6, a screenshot 600 shows a different search result 610. Search result 610 includes Documents group 455, but Documents group 455 includes a Newton's Apple document 630 that is rooted in a home directory 640 named "babu." A home directory, such as home directory 640, is an example of a particular folder that can serve as a root. Other examples include common folders/locations such as Desktop, Documents, Library, Movies, Music, Pictures, Public, and Sites. Other implementations allow a user to identify other locations as path roots, such as, for example, personal folders.

FIGS. 7-15 illustrate a progression of display options for the path of a single search result. The display options vary depending on the amount of space available for the SRP. In each of FIGS. 7-15, the space available for displaying the SRP is progressively reduced, such as might happen when a user resizes a window to make the window narrower. The progression of display options shown in FIGS. 7-15 also operates in reverse, such that more of the path is displayed as the space available for the SRP is increased. Note, however, that the scaling of FIGS. 7-15 may have distorted the apparent size of the window. In the implementations shown in FIGS. 7-15, the SRP field is assumed to occupy a single line near the bottom of each of the screenshots, as indicated.

Figure 7:
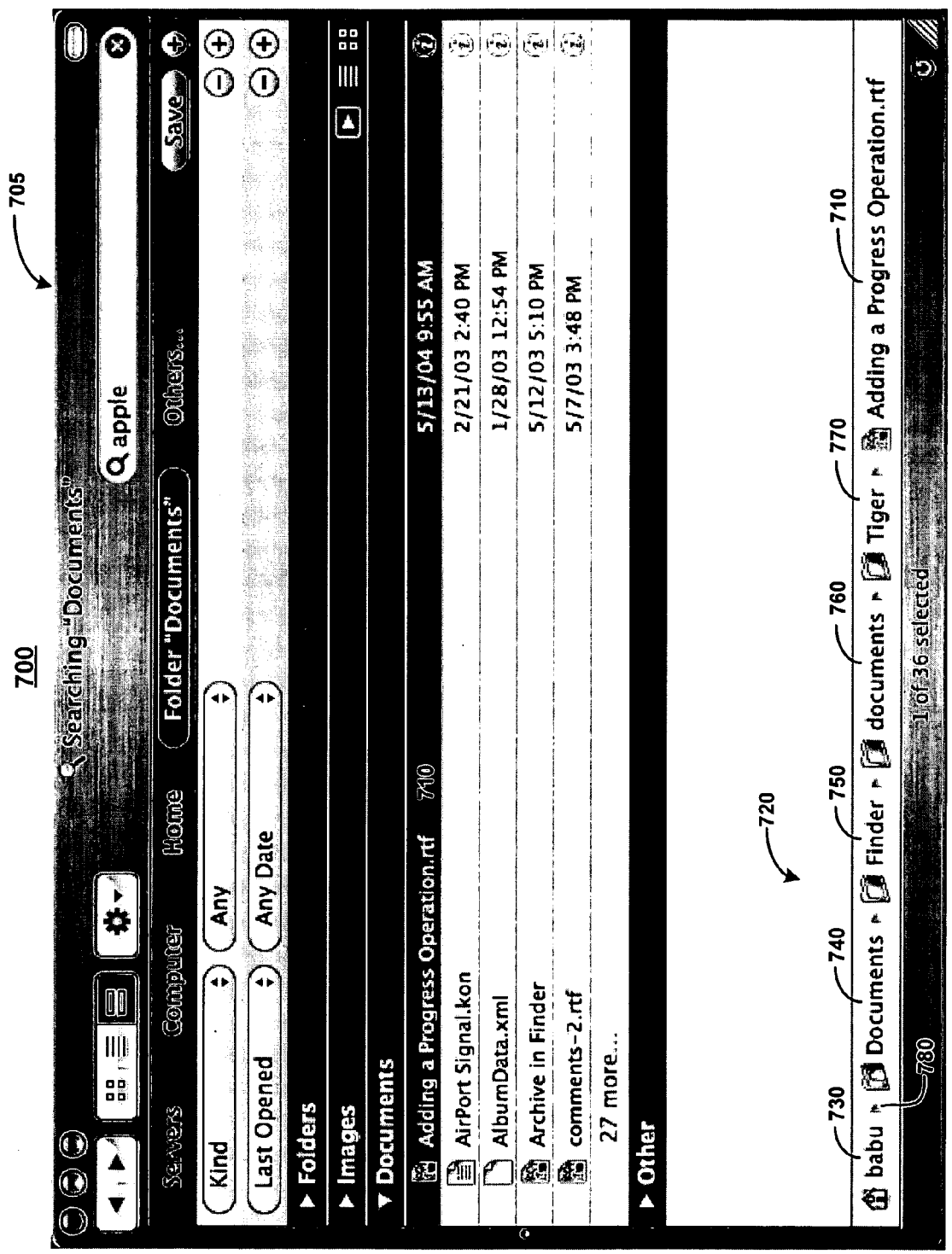
FIG. 7 is a search results window showing a full path.

Referring to FIG. 7, a screenshot 700 includes a search window 705. Search window 705 shows that a search result document 710, named "Adding a Progress Operation.rtf" is selected, and an SRP 720 is displayed for document 710. SRP 720 includes a root 730 of "babu," a first interior path element 740 of Documents, a second interior path element 750 of Finder, a third interior path element 760 of documents, a parent path element 770 of Tiger, and document 710. Screenshot 700 displays each path element of SRP 720 completely, along with separators such as a separator 780.

Figure 8:
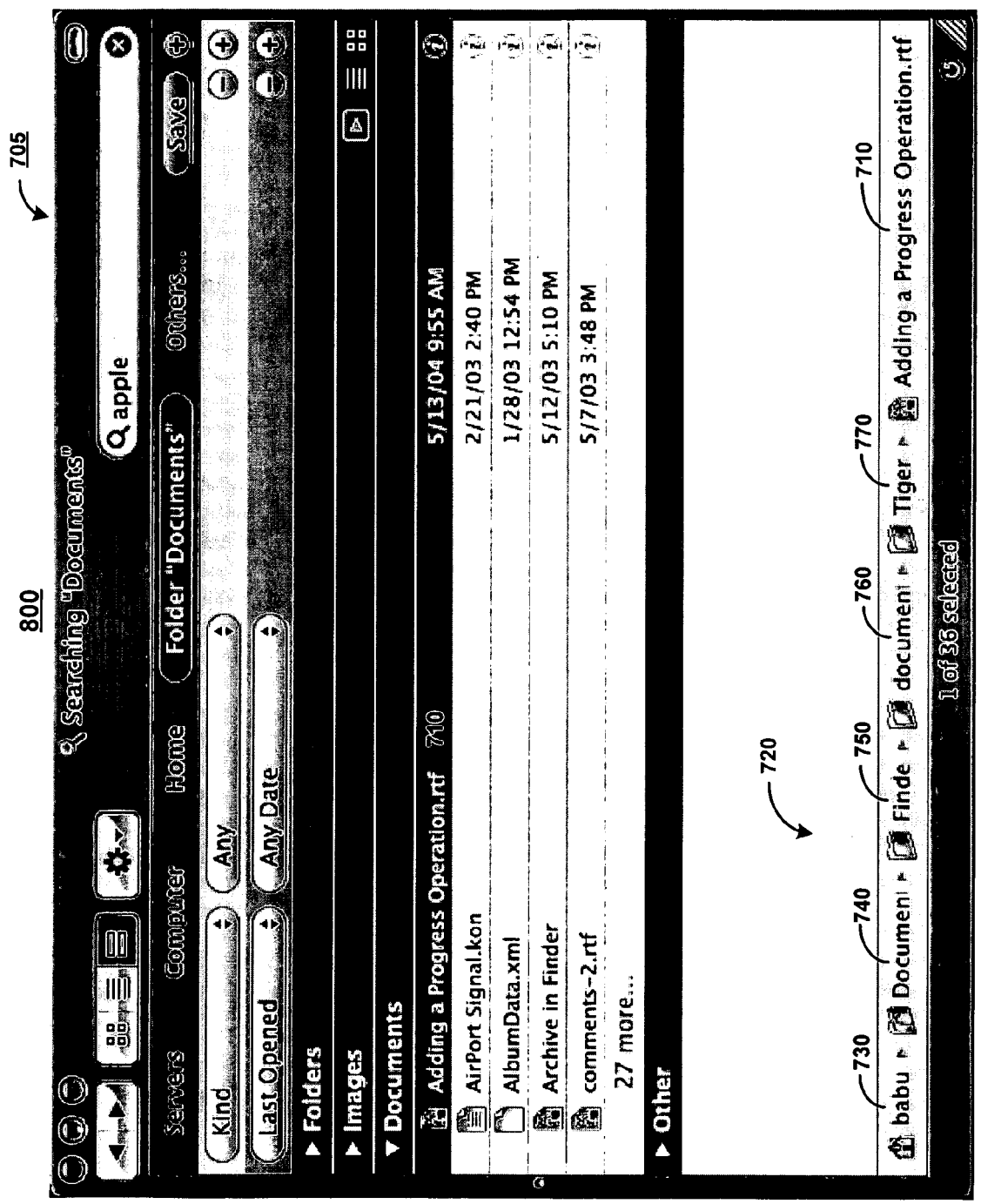
FIG. 8 is a search results window showing truncation of interior path element names of the path of FIG. 7.

Referring to FIG. 8, a screenshot 800 shows that search window 705 has been narrowed from that in screenshot 700. As a result of the narrowing, search window 705 shows SRP 720 with truncation and text-ramping applied to the interior path elements 740-760.

The term "truncating," and cognates thereof, as used herein generally refers to decreasing the size of something, such as, for example, shortening a string of characters by removing a character. Truncating does not implicitly indicate which part of an object is eliminated as a result of the decrease in size. For example, a character may be removed from the beginning, middle, or end of a string. The term "truncation" encompasses decreasing the size of an object in multiple dimensions, such as, for example, one, two, or three dimensions. Thus, truncation may be applied to graphics, such as, for example, icons, and other two or three-dimensional objects.

The truncation evidenced in screenshot 800 shows that the space available for the name of each interior path element is reduced by a particular, and common, percentage. Screenshot 800 shows that the name for first interior path element 740 has been reduced by approximately two letters (the "ts" of "Documents" is largely eliminated), the name for second interior path element 750 has been reduced by approximately one letter (the "r" of "Finder" is eliminated), and the name for third interior path element 760 has been reduced by approximately two letters (the "ts" of "documents" is largely eliminated). These three reductions correspond to a fixed percentage reduction, such as, for example, approximately twenty percent. The implementation has not truncated root 730, parent 770, or document 710 because these three path elements are considered to be more important for a user to see in their entirety. Additionally, the truncation is applied by right-truncating the names of the affected path elements so as to attempt to preserve the left-most portion of each name. The left-most portion may provide more important information for a user trying to identify a path.

Other implementations apply truncation by, for example, left-truncating, middle-truncating, and removing one or more particular types of characters, such as, for example, vowels or consonants. Right-truncation may be used, for example, to preserve the initial letters of the name; left-truncation may be used, for example, to preserve a file name extension; and middle-truncate may be used, for example, to preserve the beginning and the end of the name. Further, truncation may be applied unevenly to different path elements, reducing particular path elements by a greater percentage than others, for example by reducing the most interior path elements by a larger percentage, by reducing the left-most interior path elements by a larger percentage, by reducing path elements having longer names before reducing path elements having shorter names, or by reducing path elements having longer names by a larger percentage than path elements having shorter names.

To show that a path element was truncated, a variety of techniques may be used, such as, for example, text-ramping. Text-ramping entails fading some displayed portion of the truncated path element. For example, the right-most ten pixels may be ramped from black to the background color.

Other implementations also may use an ellipsis or another indication of omitted text to show that a path element was, for example, left-, right-, or middle-truncated. Further, if entire path elements are eliminated including both the name and the icon, then an ellipsis or other indication may be used to show that one or more path elements were eliminated. As an example, a path description may consist of an ellipsis and a search result name, indicating that all path elements preceding the search result have been eliminated.

Interior path elements 740-760 are selected based on perceived level of importance to a user that is trying to determine a search result's path, with the perceived level of importance being based on the position (an interior position) of the path element. The interior path elements are all treated similarly and as a unit. Other implementations, however, need not base a perceived level of importance on position but may use, for example, a relationship between the data elements, a hierarchy among the data elements, and categories represented by the data elements. Additionally, other implementations may use criteria other than path-identifying importance for selecting path elements for less preferential display. Such other criteria may include, for example, preferentially displaying a user's common folders, or path elements that are considered more relevant to the search. Additionally, implementations may allow a user to specify which path elements are preferentially displayed and the user's preferences may be accepted using, for example, a user interface or an application program interface.

Figure 9:
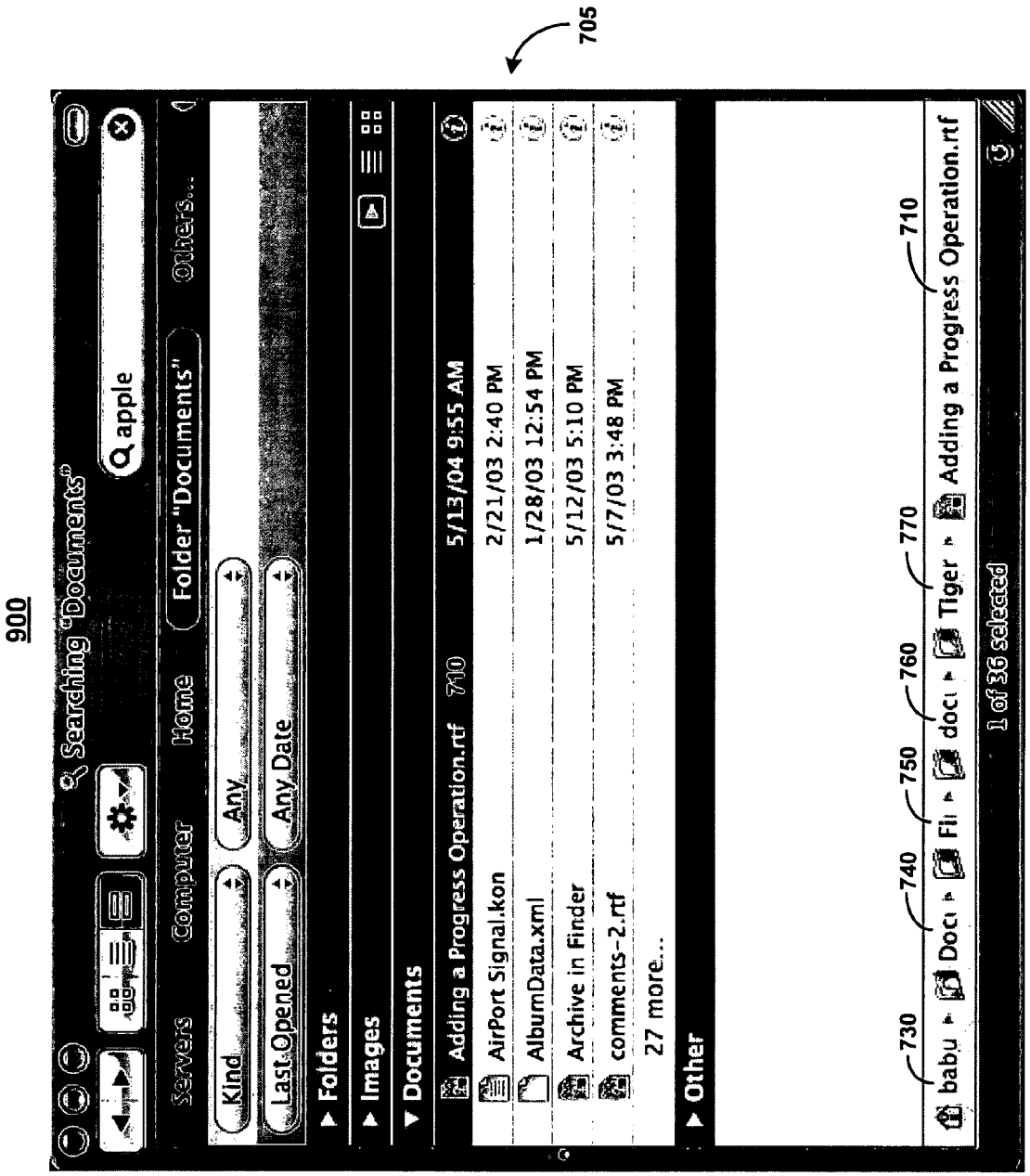
FIG. 9 is a search results window showing increased truncation of the interior path element names of FIG. 8.

Referring to FIG. 9, a screenshot 900 shows that search window 705 has been narrowed from that in screenshot 800. As a result of the narrowing, the truncation of path elements 740-760 has increased to approximately 65%.

Figure 10:
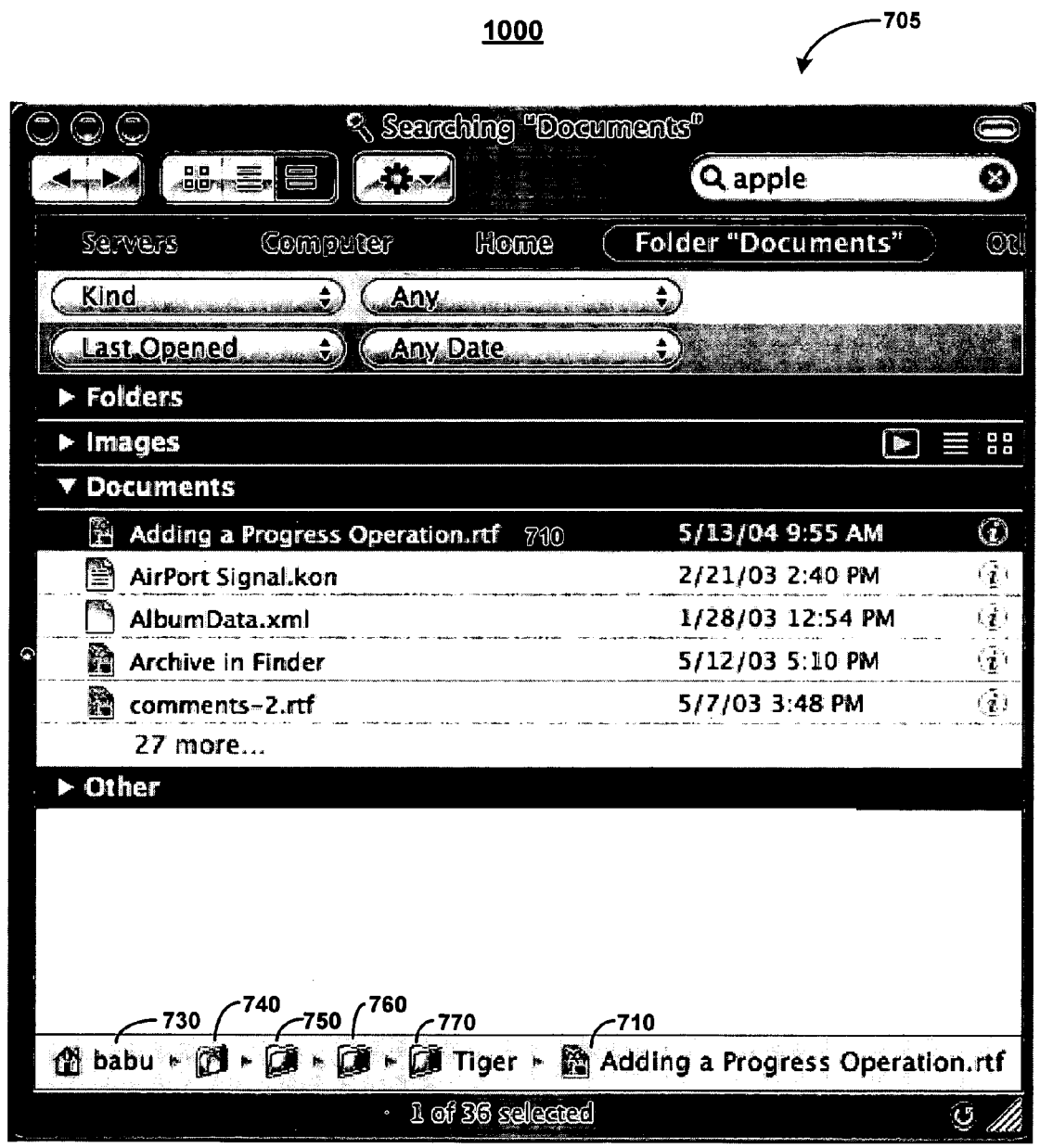
FIG. 10 is a search results window showing elimination of the interior path element names of FIG. 9.

Referring to FIG. 10, and a screenshot 1000 shows that search window 705 has been narrowed from that in screenshot 900. As a result of the narrowing, the truncation of path elements 740-760 has increased to 100%. In screenshot 1000, only icons are displayed for interior path elements 740-760. Icons themselves can be chosen so as to provide descriptive information to the user about the identity of the location/information that the icon represents (for example, a trash can icon representing the trash location). An implementation may, for example, provide custom icons or allow an application or a user to provide custom icons.

Figure 11:
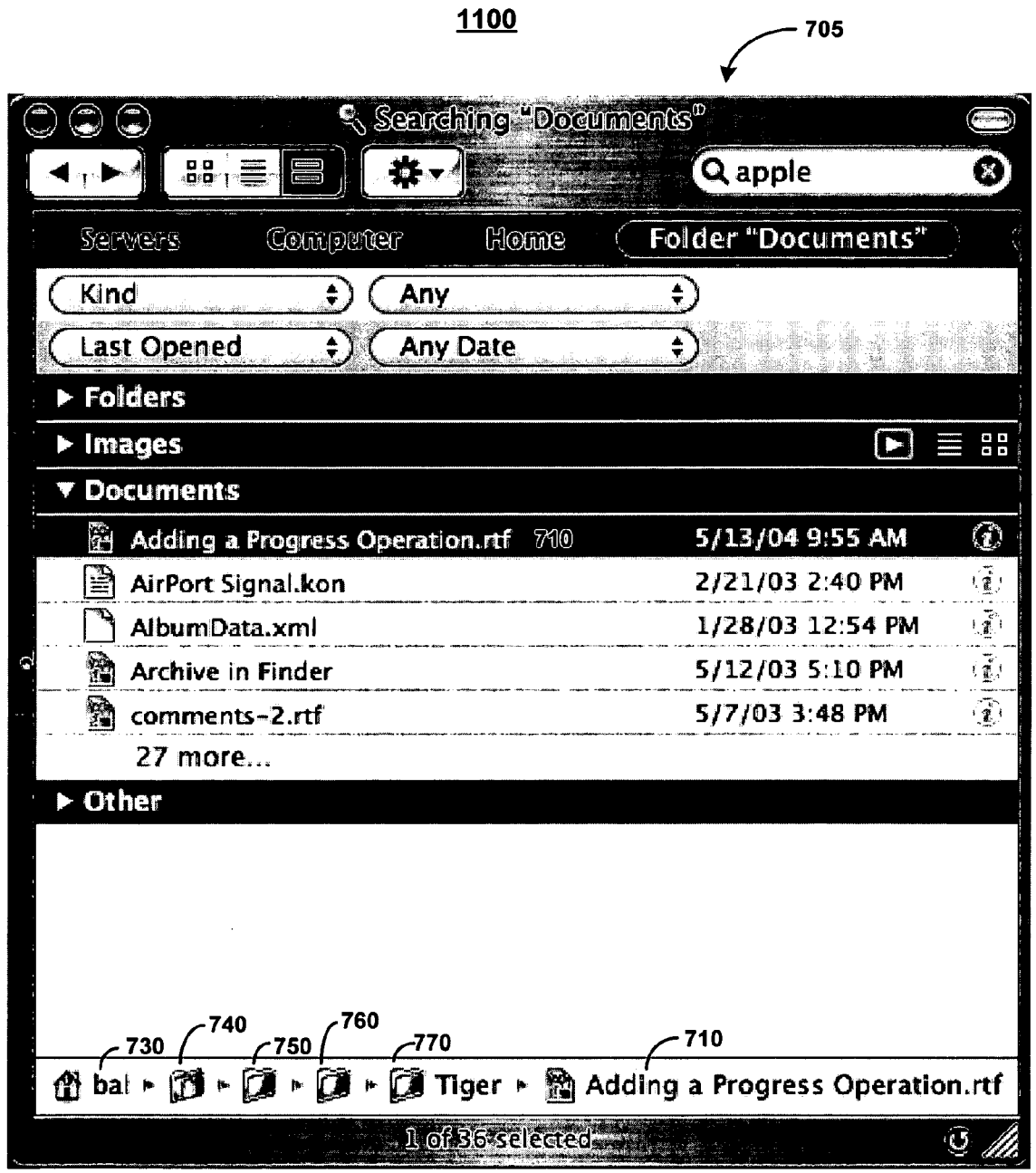
FIG. 11 is a search results window showing truncation of a root name of FIG. 10.

Referring to FIG. 11, a screenshot 1100 shows that search window 705 has been narrowed from that in screenshot 1000. As a result of the narrowing, truncation has now been applied to the name of root 730, reducing the space allotted to the name "Babu" by approximately 50%.

Figure 12:
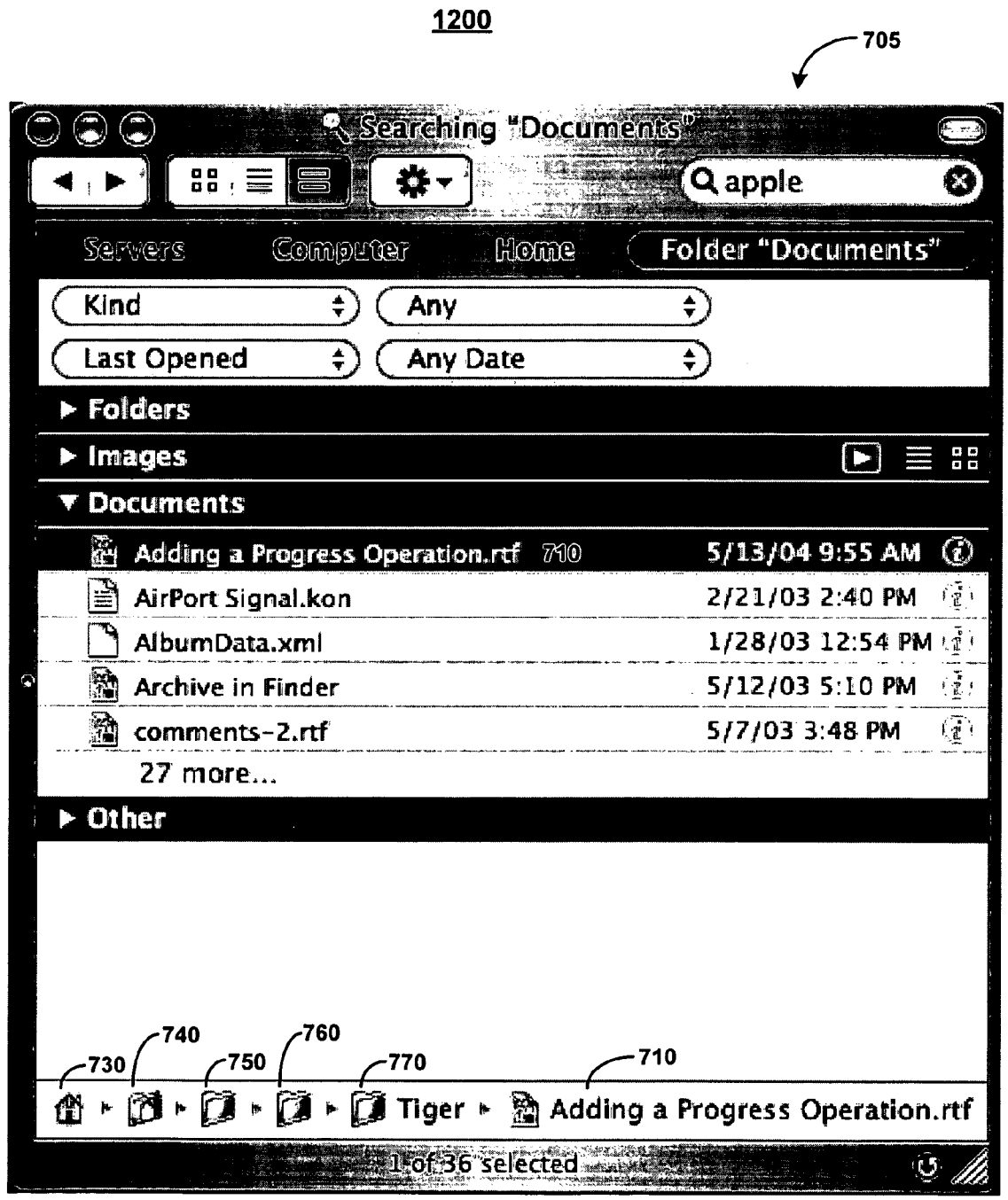
FIG. 12 is a search results window showing elimination of the root name of FIG. 11.

Referring to FIG. 12, a screenshot 1200 shows that search window 705 has been narrowed from that in screenshot 1100. As a result of the narrowing, the truncation of root 730 has increased to 100%, and root 730 is displayed only with an icon.

Figure 13:
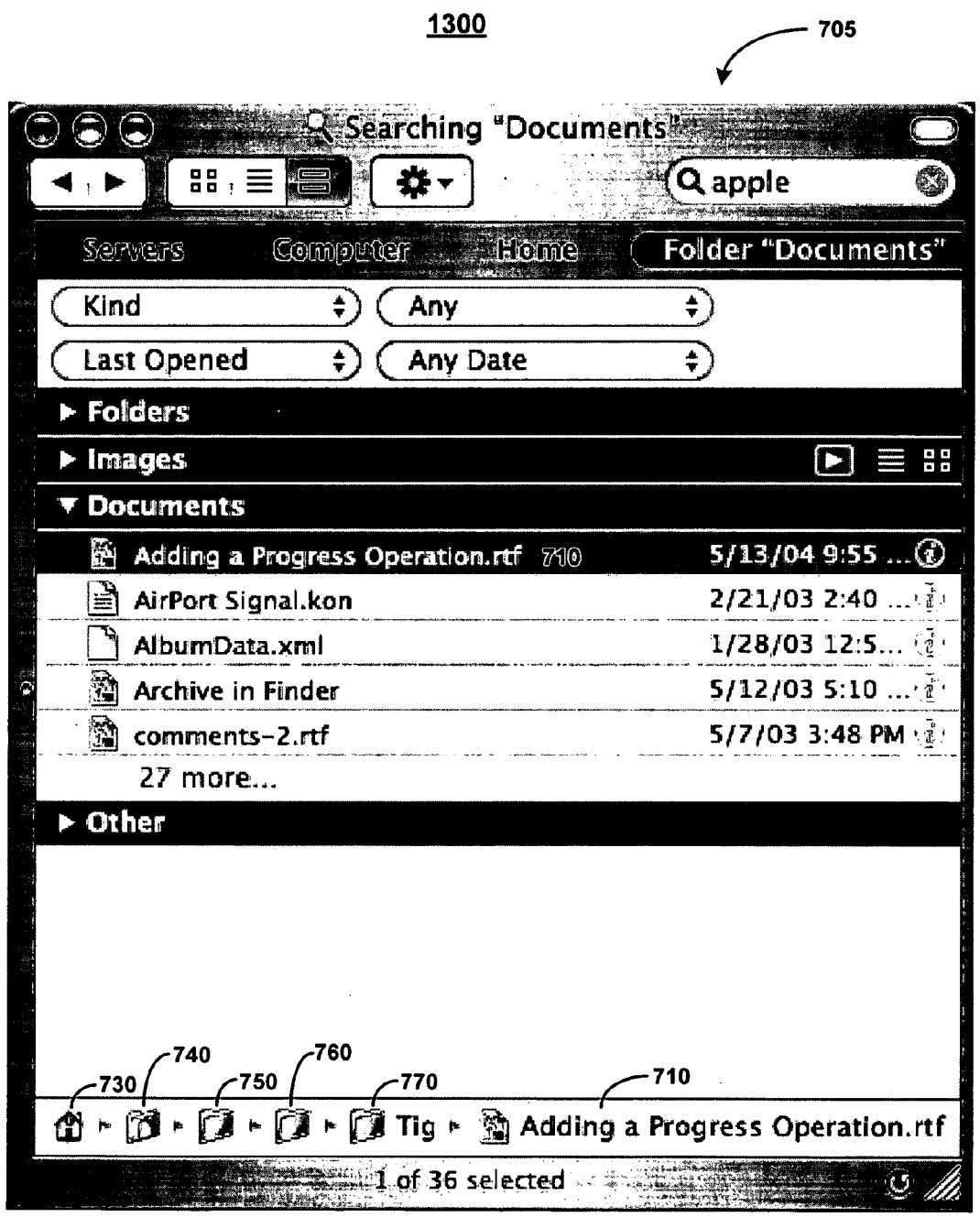
FIG. 13 is a search results window showing truncation of a parent name of FIG. 12.

Referring to FIG. 13, a screenshot 1300 shows that search window 705 has been narrowed from that in screenshot 1200. As a result of the narrowing, truncation has now been applied to the name of parent 770, reducing the space allotted to the name "Tiger" by approximately 50%.

Figure 14:
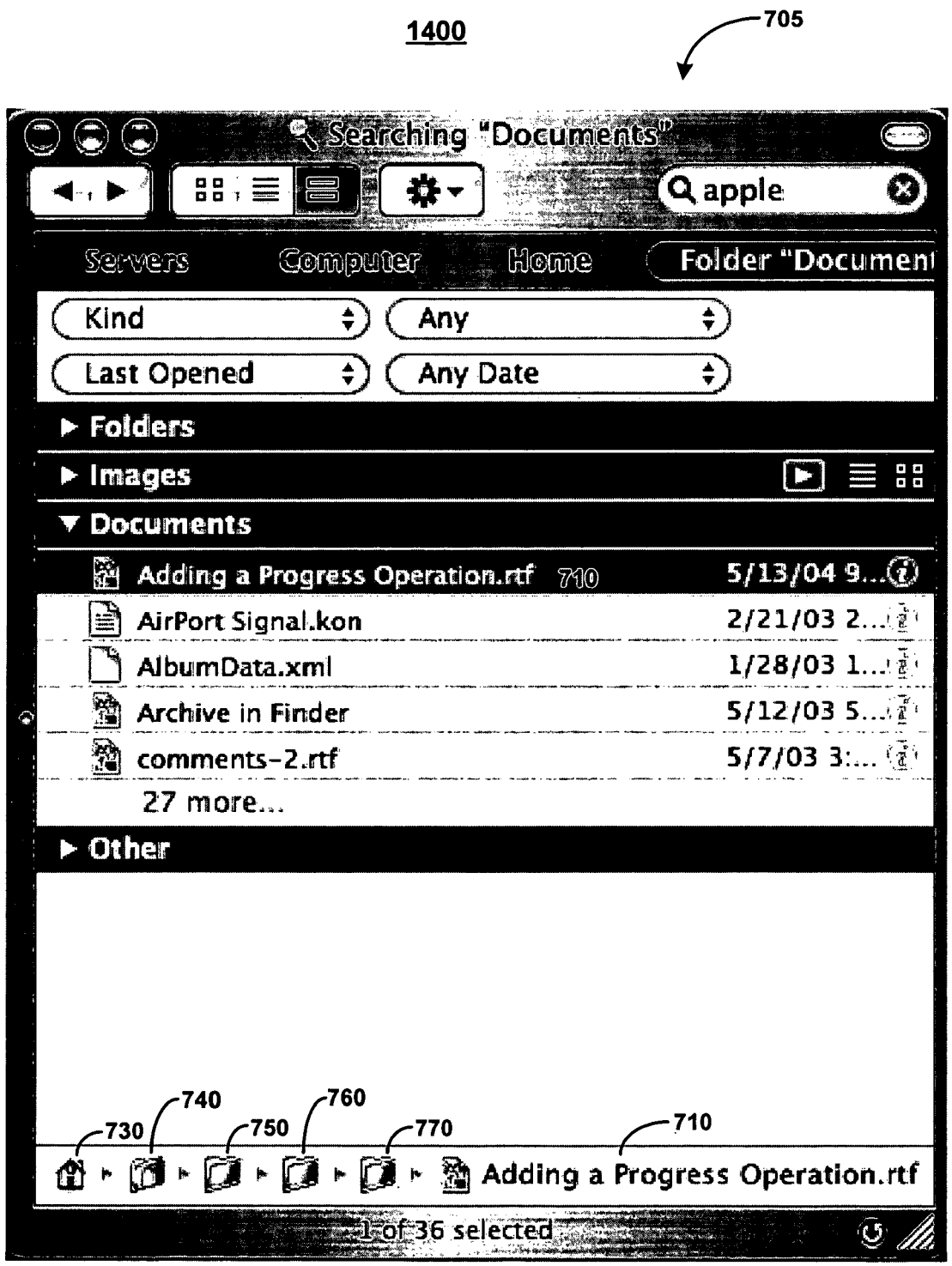
FIG. 14 is a search results window showing elimination of the parent name of FIG. 13.

Referring to FIG. 14, a screenshot 1400 shows that search window 705 has been narrowed from that in screenshot 1300. As a result of the narrowing, the truncation of parent 770 has increased to 100%, and parent 770 is displayed only with an icon.

Figure 15:
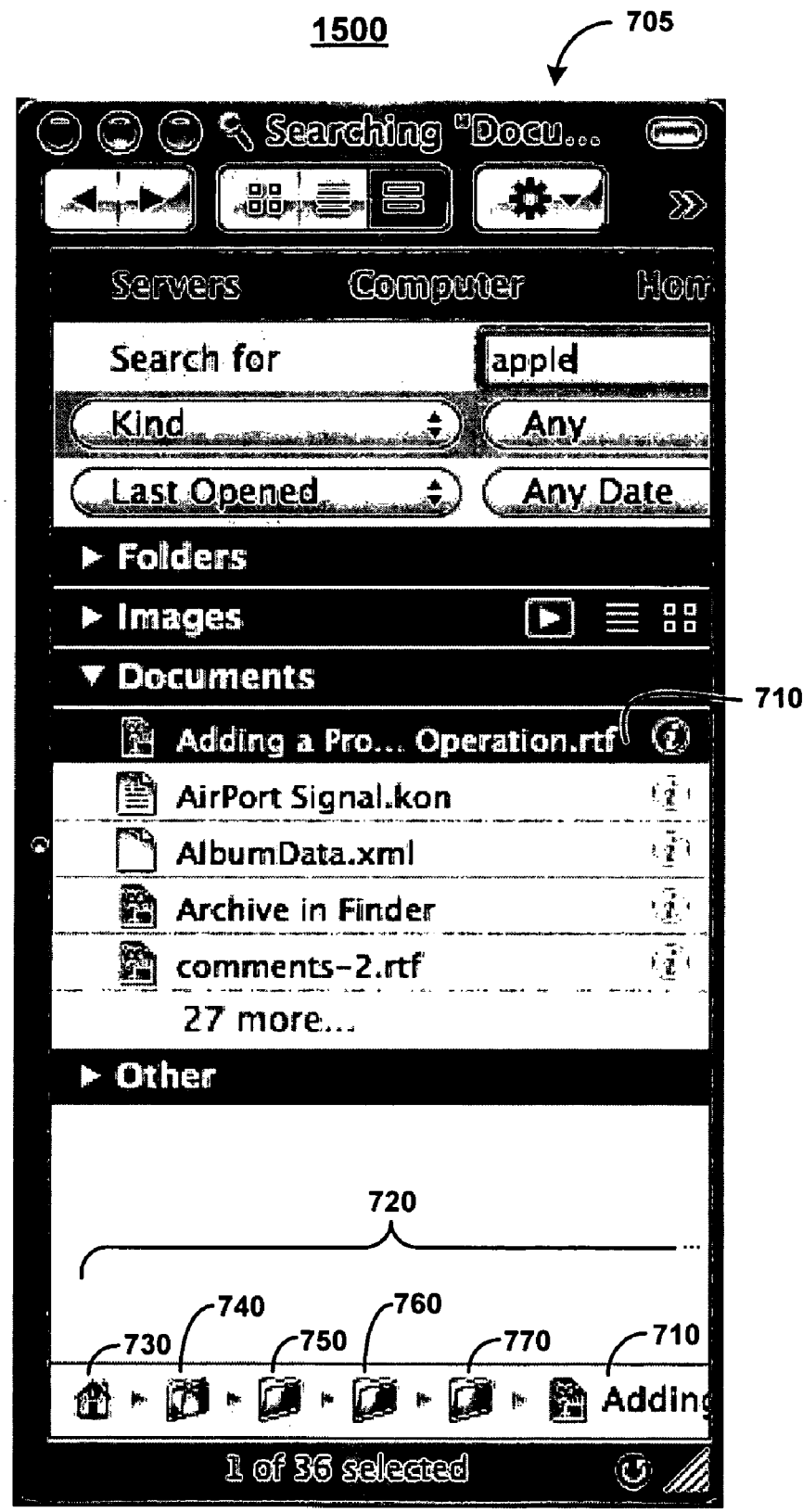
FIG. 15 is a search results window showing a file name of FIG. 14 being obscured.

Referring to FIG. 15, a screenshot 1500 shows that search window 705 has been narrowed from that in screenshot 1400. As a result of the further reduction of the available space for SRP 720, the name of document 710 is obscured. That is, the full name is drawn but due to the narrow size of the window, for example, a portion of the end of the name is not visible to the user. A similar visual result may be obtained by right-truncating the name of document 710, without applying text-ramping. Other implementations may truncate and apply text-ramping, and the truncation may be of a variety of forms. Screenshot 1500 is intended to represent a minimum window width, and therefore a minimum space available for SRP 720. Accordingly, a user may not be able to reduce the width of window 705 further. Such a minimum may be user-configurable, however.

Figure 16:
FIG. 16 is a search results window showing a path with all names eliminated except the full file name.
Figure 17:
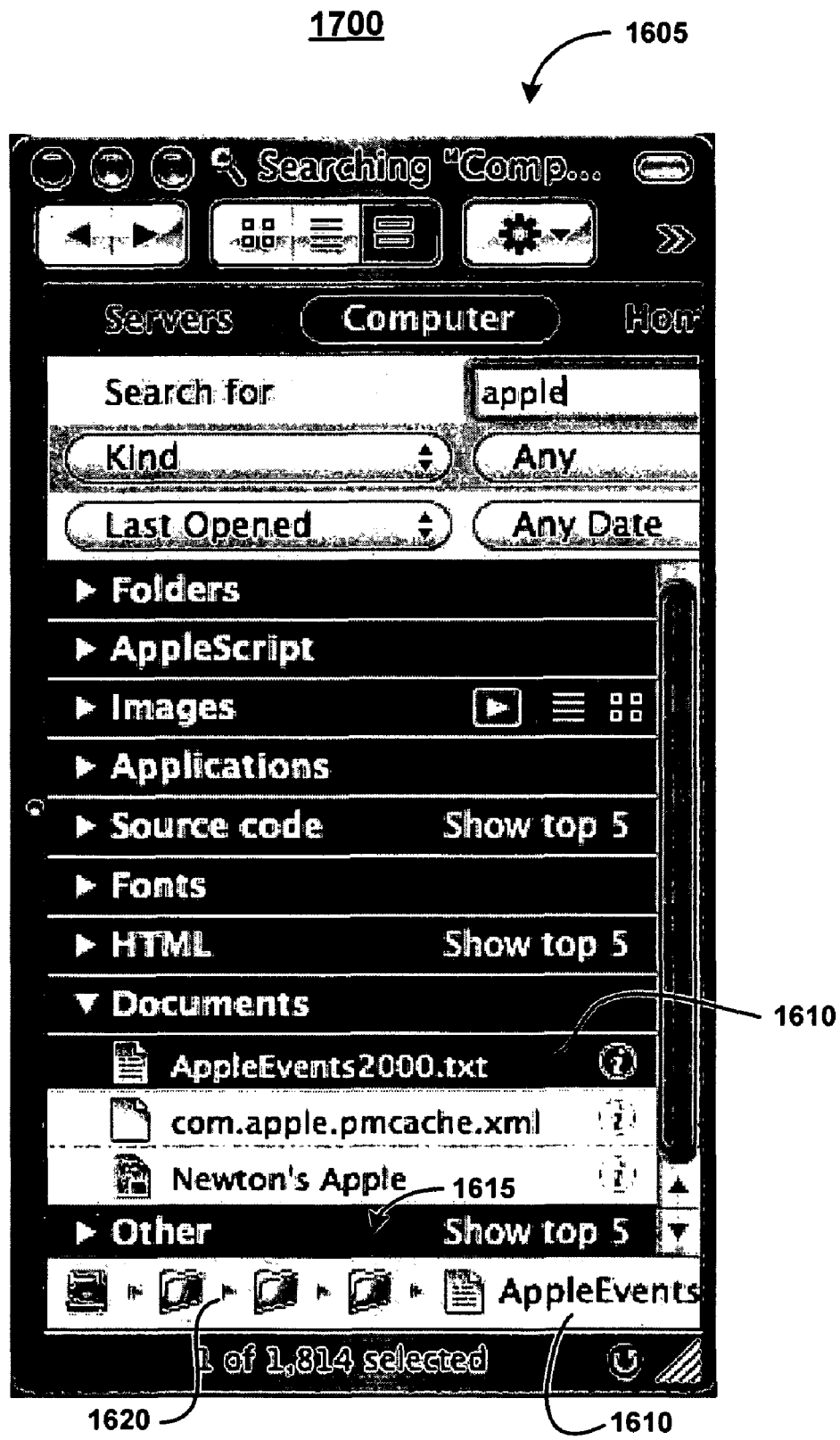
FIG. 17 is a search results window showing the file name of FIG. 16 being obscured.
Figure 18:
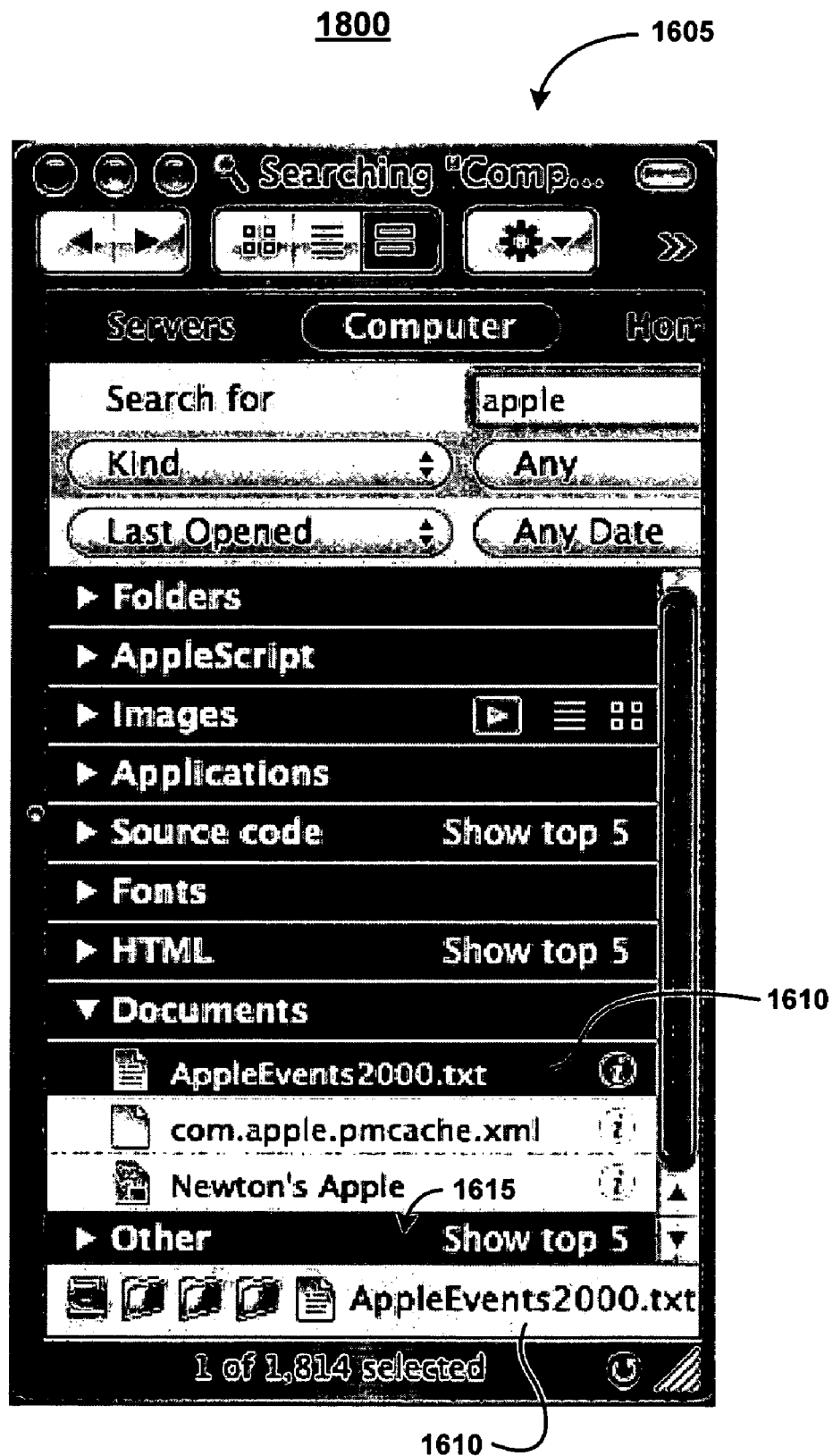
FIG. 18 is a search results window showing elimination of path element separators of FIG. 16.

FIGS. 16-18 illustrate the removal of path element separators to further reduce the space needed to display an SRP. Referring to FIG. 16, a screenshot 1600 includes a search window 1605 showing that a document 1610 titled "AppleEvents2000.txt" is selected. Due to the narrow width of search window 1605, an SRP 1615 displays only icons for the root, interior path elements, and parent, along with path element separators 1620 and the full name of document 1610.

Referring to FIG. 17, a screenshot 1700 shows that search window 1605 has been narrowed from that in screenshot 1600. As a result of the narrowing, the name of document 1610 is obscured from view. SRP 1615 still includes path element separators 1620 between the icons of SRP 1615.

Referring to FIG. 18, a screenshot 1800 also shows that search window 1605 has been narrowed from that in screenshot 1600. The width of search window 1605 in screenshots 1700 and 1800 is approximately the same, and screenshot 1800 provides an alternative rendering of SRP 1615. As a result of the narrowing from screenshot 1600, separators 1620 are removed from SRP 1615. The removal of separators 1620 may be triggered by a variety of factors, such as, for example, the narrowing of an SRP field to a point at which the full name of search result document 1610 can no longer be displayed, as suggested by the progression of screenshot 1600 to screenshot 1800. Alternatively, removal of separators 1620 may be triggered by another event and may occur, for example, prior to truncating any interior path element names.

Figure 19:
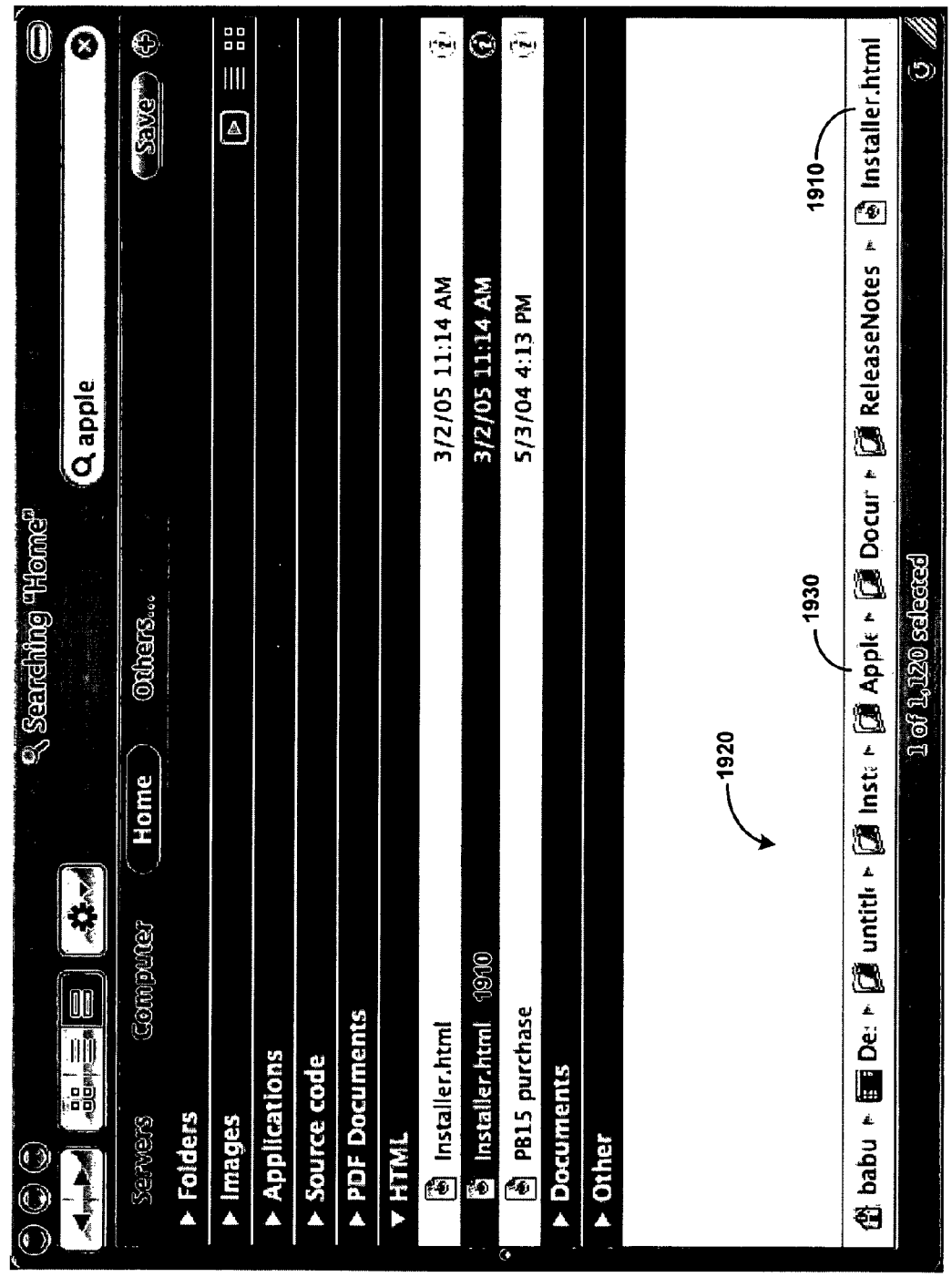
FIG. 19 is a search results window showing a path with truncation applied to all interior path element names.
Figure 20:
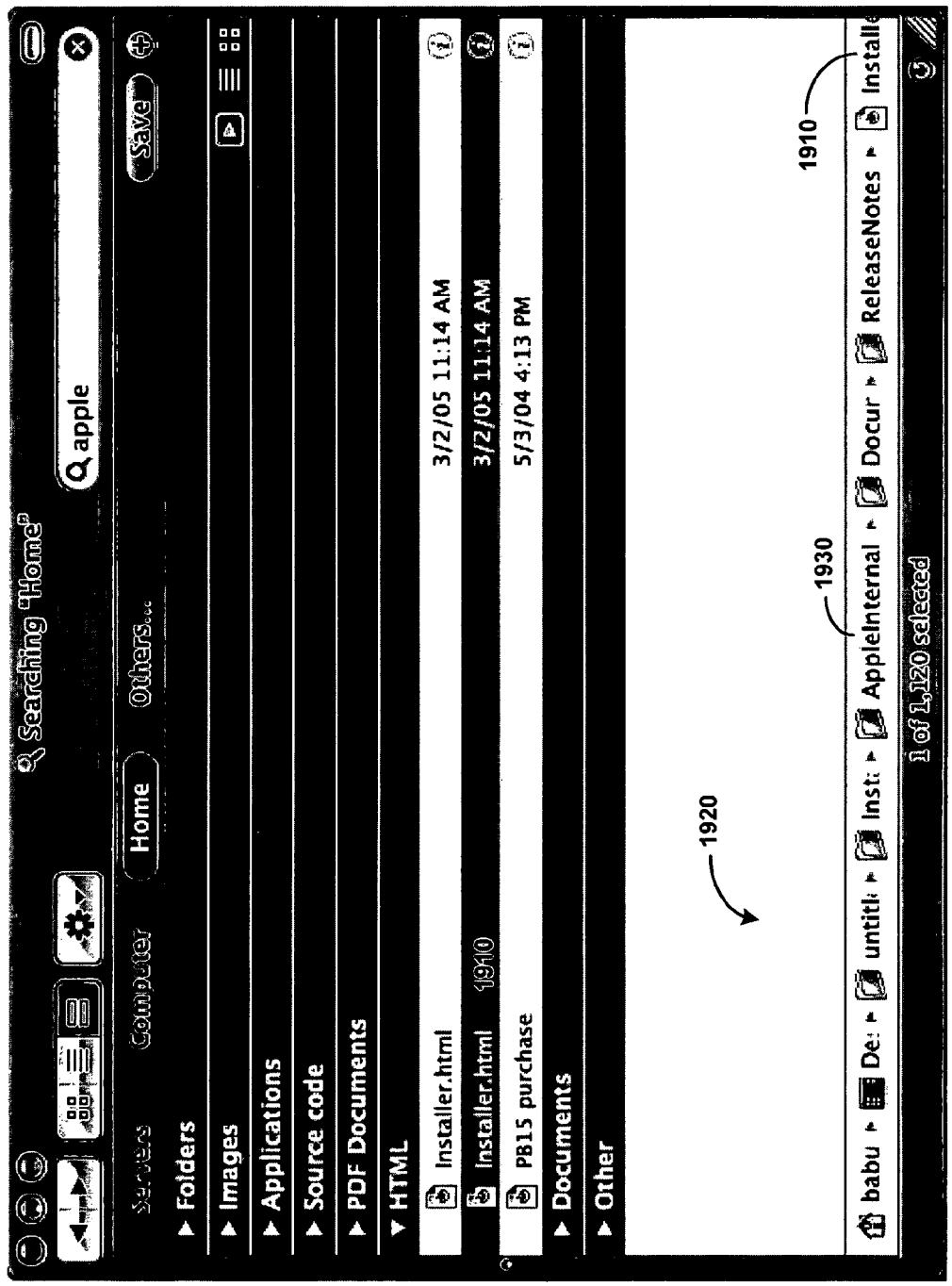
FIG. 20 is a search results window showing an expansion of a selected interior path element name of FIG. 19.
Figure 21:
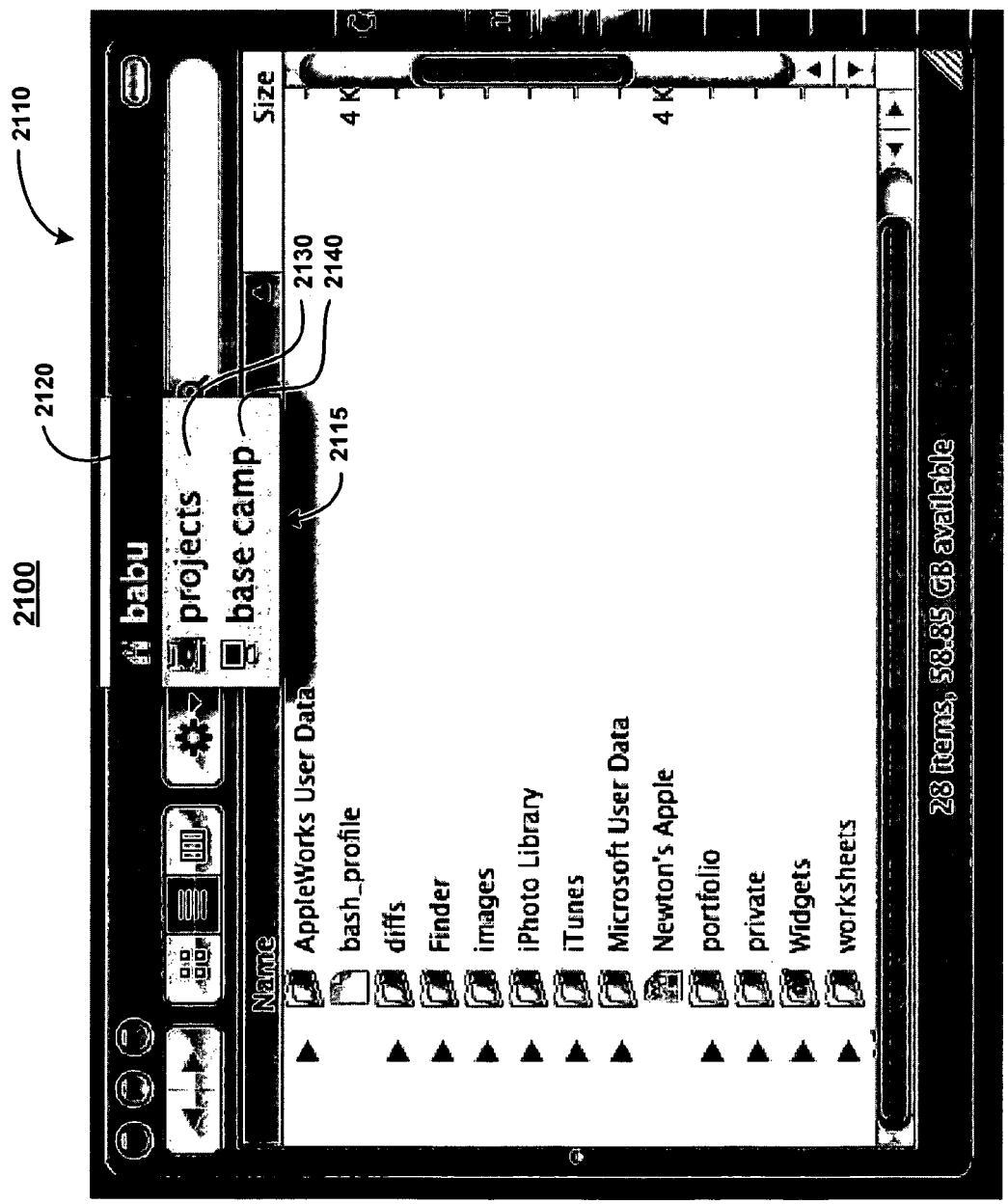
FIG. 21 is a directory list window showing a path pop-up menu.

FIGS. 19-21 illustrate techniques for providing a user with more information about a path. Such techniques may be particularly useful given that an SRP may not reveal all of the information available for the path elements, particularly if an SRP field is small.

Referring to FIG. 19, a screenshot 1900 shows that a document 1910 named "Installer.html" is selected, and that a corresponding SRP 1920 for document 1910 is displayed. An interior path element 1930 is shown with truncation applied.

Referring to FIG. 20, a screenshot 2000 shows that interior path element 1930 has been expanded to show the full name of path element 1930, which is "AppleInternal." To make room for the expansion of path element 1930, the path elements to the right are shifted resulting in the name of document 1910 being obscured in screenshot 2000. Other implementations may shift the path elements to the left, or shift the path elements both left and right. Again, note that due to scaling of the figures, the apparent size of the screenshots may have been distorted.

The expansion of path element 1930 may be triggered by, for example, hovering over path element 1930 with a mouse or other pointing device. This hovering-to-expand feature allows a user to temporarily view a path element's full name and, by hovering over each of the path elements in succession, to temporarily view an entire SRP. The expansion, upon hovering, may be implemented as a gradual expansion of the name when the mouse hovers or may be performed as a one-shot expansion to the full name when the mouse hovers. A gradual expansion may gradually reveal the name, from left to right, and a user may decide to stop hovering before full expansion is reached if the user recognizes the name from a partial expansion. Other implementations also may use hovering to provide additional functions or operations, such as, for example, magnification of a path element name. Implementations also may allow a user to configure the font size of the SRP.

Referring to FIG. 21, a screenshot 2100 illustrates another technique allowing a user to temporarily view an entire path. Screenshot 2100 includes a window 2110 showing the contents of a folder. Window 2110 further includes a pull-down window 2115 that may be obtained, for example, by command-clicking a mouse button on a top portion, such as a title bar, of window 2110. Pull-down window 2115 shows the path for window 2110, including (i) an indication of a folder 2120, referred to as "babu," whose contents are displayed in screenshot 2100, (ii) a parent 2130 of folder 2120, referred to as "projects," and (iii) a root 2140 identifying a computer referred to as "base camp." Pull-down window 2115 also provides additional functionality by allowing a user to select any of the path elements. Such selection may cause a variety of functions to be performed, such as, for example, if the path element is a folder, a window may be opened showing the contents of the selected path element.

The path display provided by window 2115 may be adapted to include one or more of the features described with respect to, for example, FIGS. 7-15. For example, the path display provided in window 2115 may include a progression of techniques to compress a path's display if sufficient space is not provided to display all of the information of the path. Such an adaptation of window 2115, for example, may provide a mechanism for obtaining a path display similar to SRP 720 in a variety of contexts outside of the search utility. An adaptation of window 2115 that displays all of the path information may also be provided within the search utility and may be useful, for example, if the search utility window is narrow and the search results path does not display all of the path information.

Figure 22:
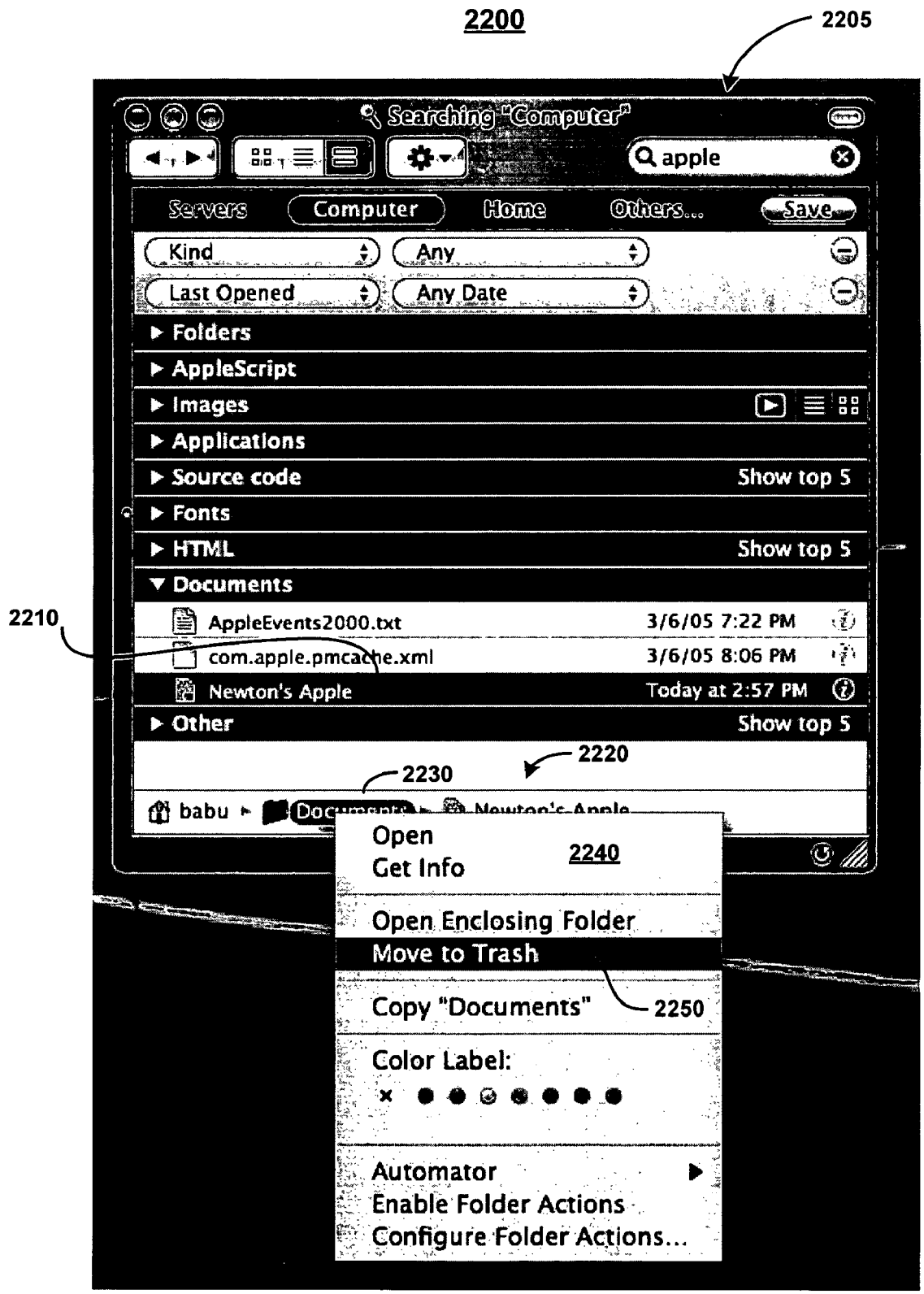
FIG. 22 is a search results window showing a contextual pop-up menu for a path element.
Figure 23:
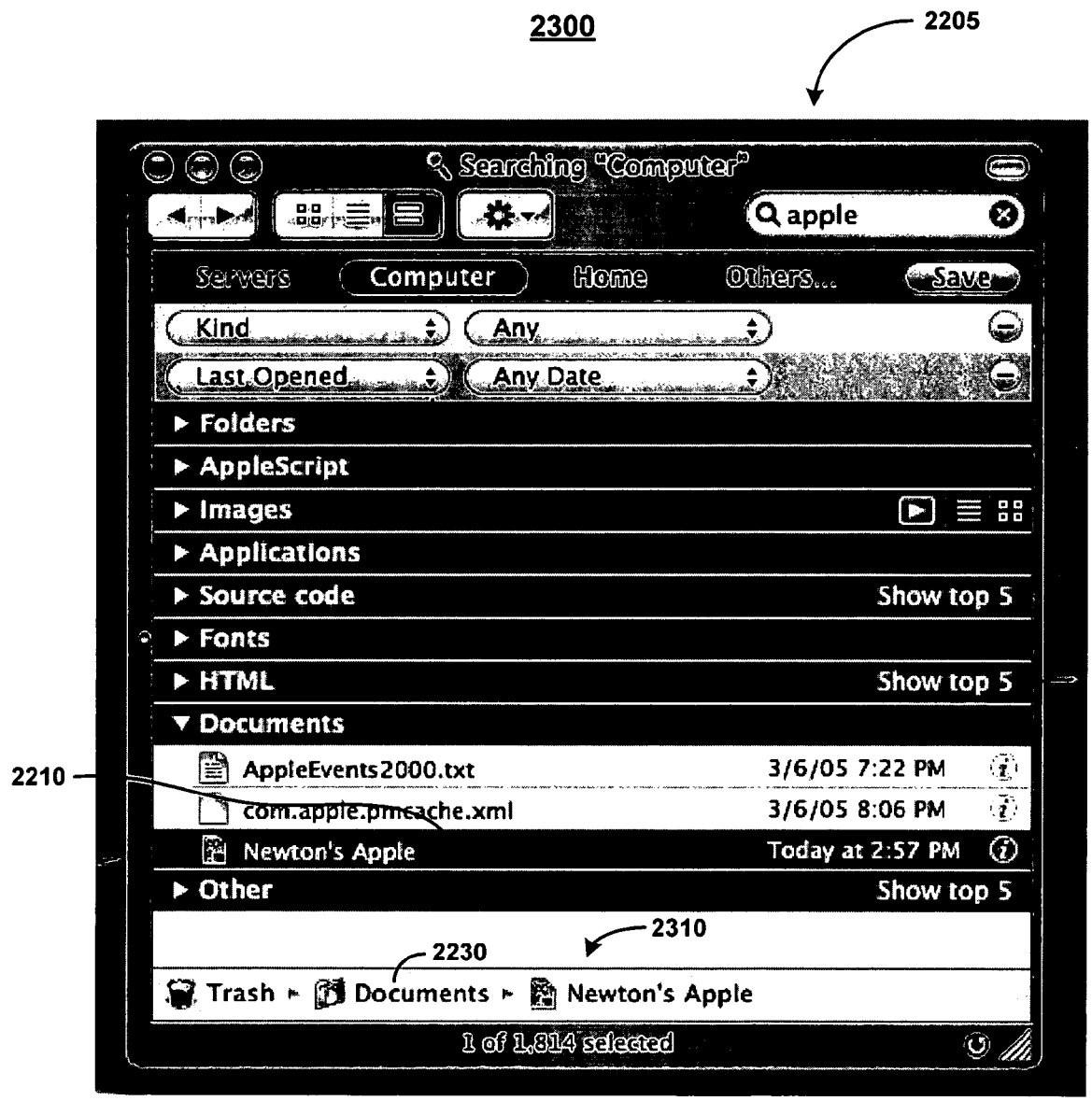
FIG. 23 is a search results window showing the use of the contextual pop-up menu of FIG. 22 and showing a dynamically updated path.

FIGS. 22 and 23 illustrate a technique for providing a user with additional information or functionality with respect to a given path element. Referring to FIG. 22, a screenshot 2200 includes a search window 2205 showing that a document 2210 named "Newton's Apple" is selected. Search window 2205 also shows that an SRP 2220 is displayed for document 2210, and SRP 2220 includes a parent path element 2230 named "Documents."

By control-clicking on path element 2230, a contextual window 2240 opens providing a user with a variety of functionality with respect to path element 2230. For example, window 2240 includes an option 2250 for moving path element 2230 to the trash. Depending on the type of path element represented by path element 2230, different functions may be provided in contextual window 2240. For example, a contextual window may allow a user to rename a file name.

Referring to FIG. 23, a screenshot 2300 includes a new instantiation of search window 2205 that results after path element 2230 is moved to the trash using option 2250 in window 2240 of screenshot 2200. Screenshot 2300 shows a new SRP 2310 for path element 2230, indicating that path element 2230 is rooted in the trash. Thus, the SRP of a document is, as shown, updated dynamically as the document is moved between locations. The SRP also may update dynamically to reflect various other changes to the displayed information. For example, a change to the name of a search result or path element may be dynamically reflected in the SRP. Such a change also may cause a search result dynamically to move to another group or to be removed from the set of search results.

Figure 24:
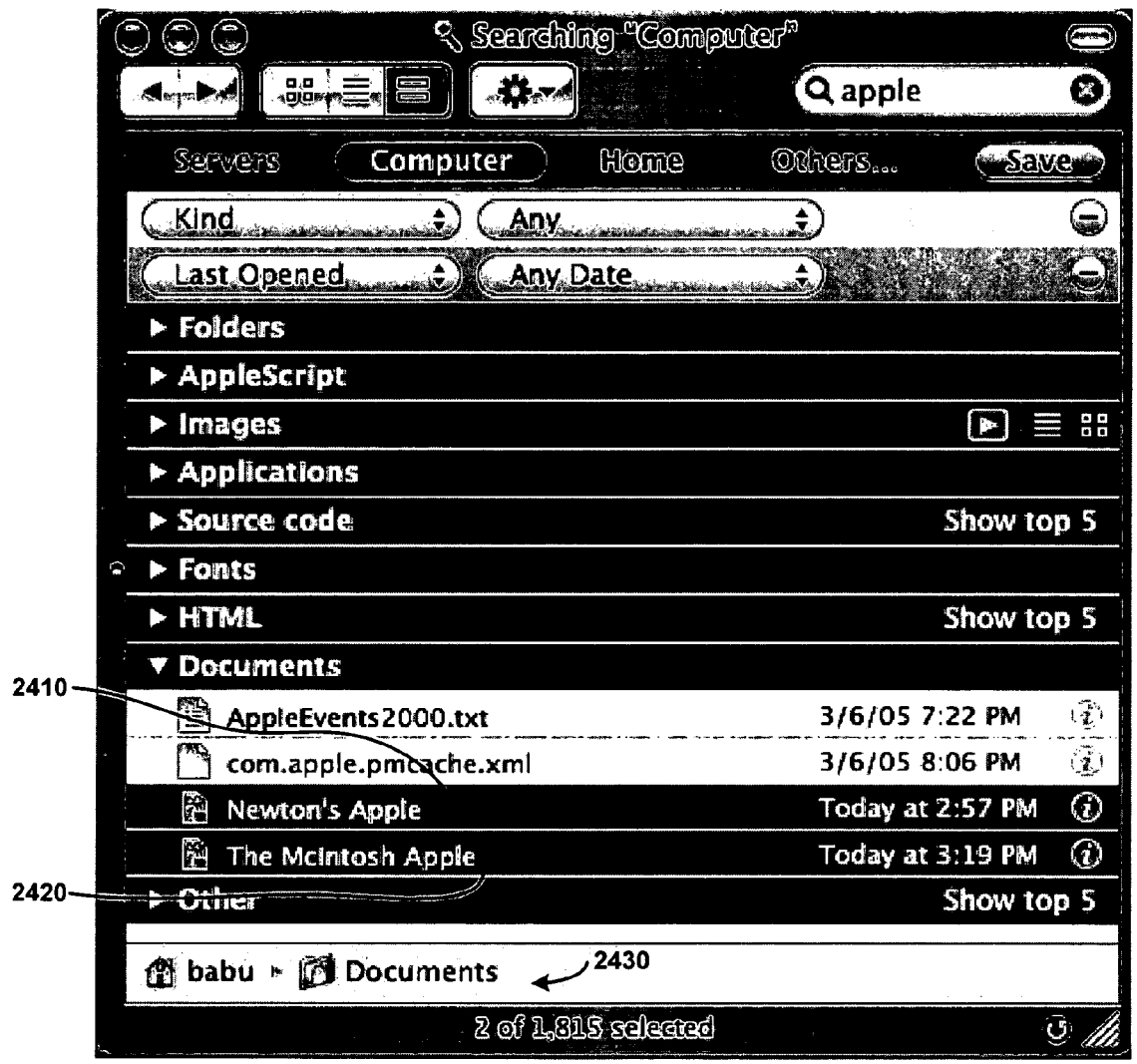
FIG. 24 is a search results window showing a common path for two selected search results.
Figure 25:
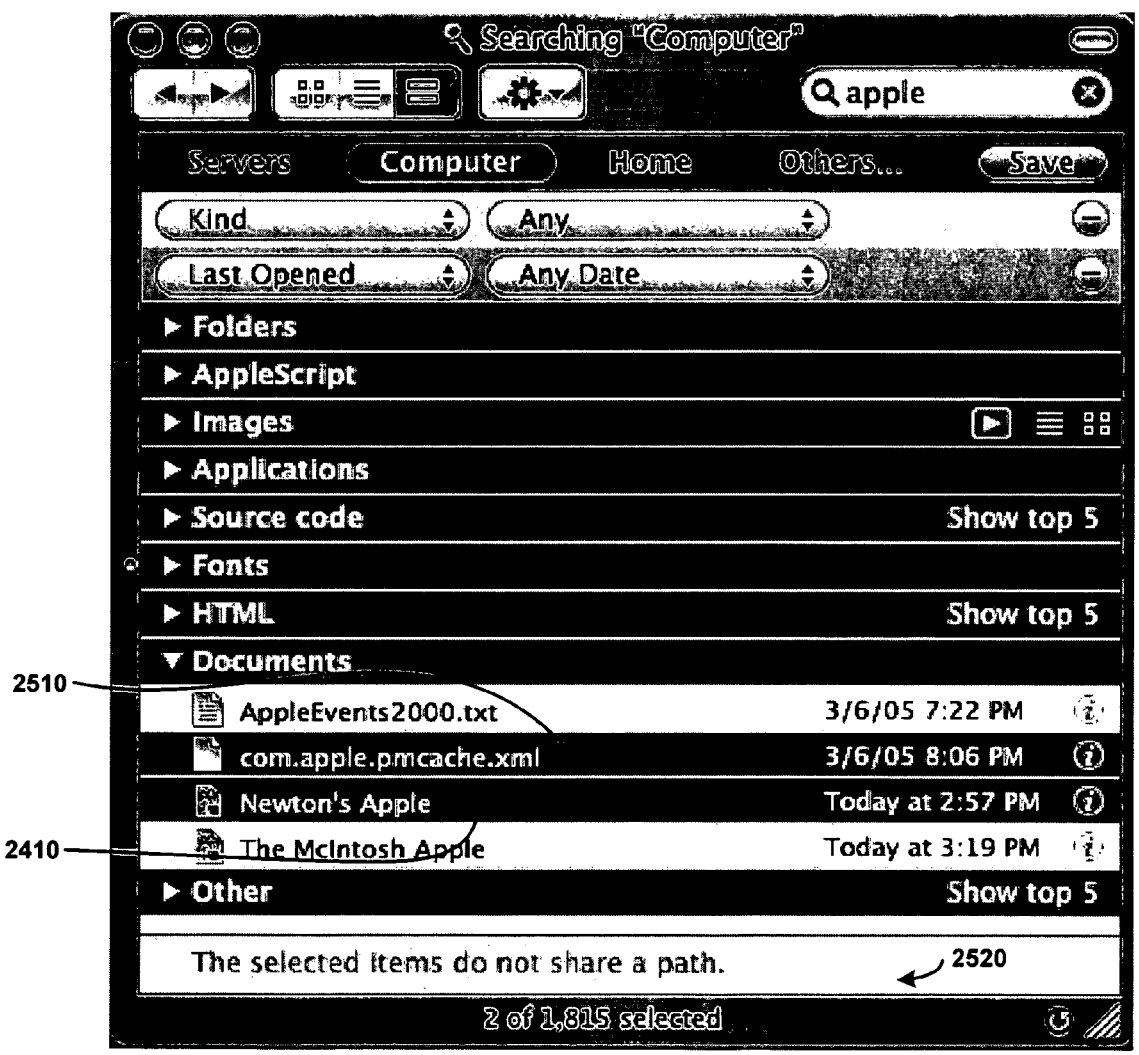
FIG. 25 is a search results window showing that two selected search results do not have a common path.

FIGS. 24 and 25 illustrate a feature that displays a common path, if possible, between two or more search results. Such a feature may be useful in the present implementation because the display of search results is not organized in terms of locations, so it is not necessarily evident from a search results window whether two or more search results are contained in the same directory.

Referring to FIG. 24, a screenshot 2400 shows that a document 2410 named "Newton's Apple" and a document 2420 named "The McIntosh Apple" are selected. Documents 2410 and 2420 have a common parent, and the path to the parent is displayed in SRP 2430.

Referring to FIG. 25, a screenshot 2500 shows that document 2410 is still selected, but that document 2420 is no longer selected and in its place a document 2510 named "com.apple.pmcache.xml" is selected. Documents 2410 and 2510 do not have a common parent, as indicated by a message 2520. The implementation illustrated only displays a path if the selected search results have a common parent, and thus share a common path down to the parent. Other implementations display any portion of a path that is shared by selected search results, and provide an indication of whether or not the shared path is a complete or partial path. Implementations may provide one or more messages, such as message 2520, that, for example, provide a user with information about the user's selection or prompt the user to take a particular action.

Other implementations provide a path description in environments other than a search results window. For example, a path may be provided, or made available, for a directory listing or another window that lists a file. A path also may be provided within applications, such as, for example, to provide a path within an e-mail application, a document creation application, and an audio playback application. In one implementation, a path is provided in an e-mail application to show the location of a selected e-mail message in an e-mail message search utility. In another implementation, a path is provided in a document creation program to show the location of recently accessed documents. In another implementation, a path is provided in an audio playback application to show the location of songs in a playlist.

Figure 26:
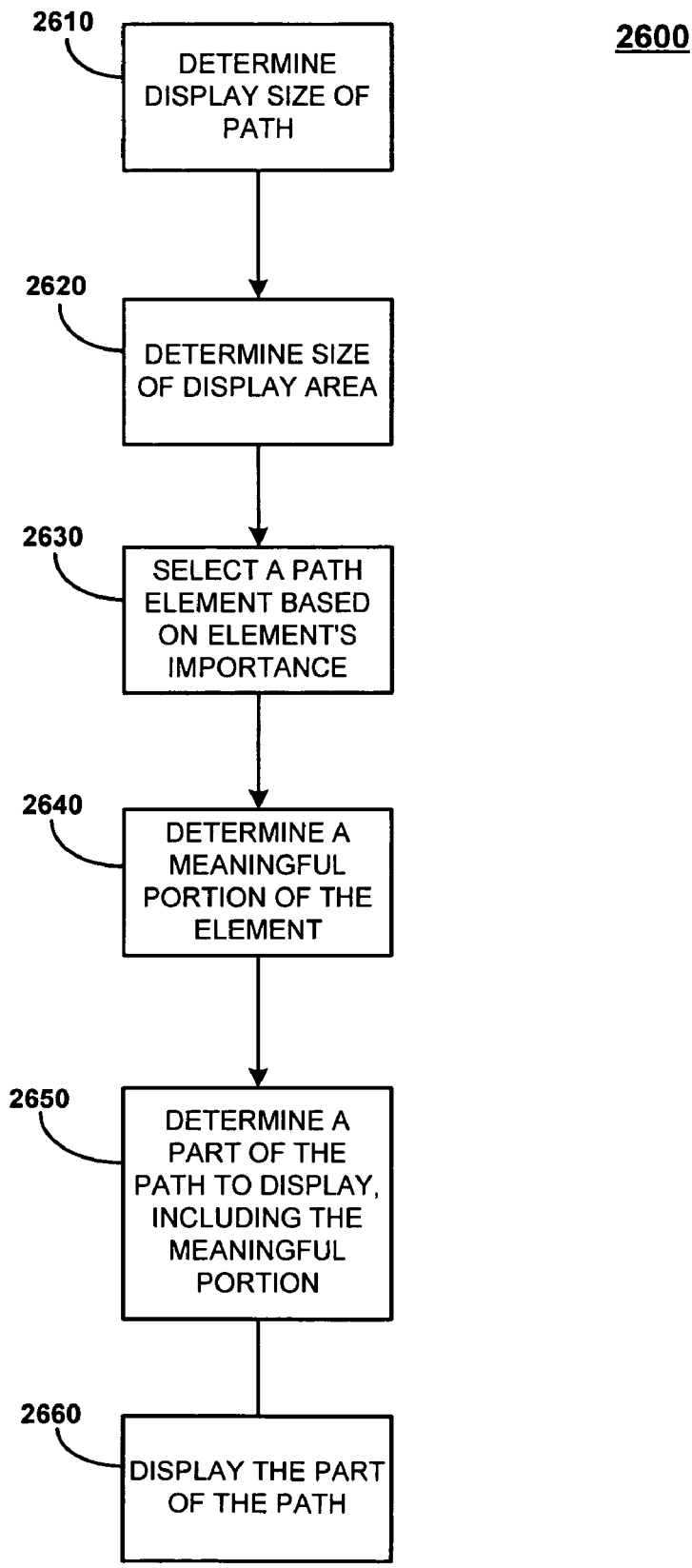
FIG. 26 is a flow chart of a process for displaying a path.

Referring to FIG. 26, a process 2600 is shown for displaying a path. Process 2600 is not restricted to displaying a path in a search results window. Process 2600 includes determining a display size of the full path (2610), and determining a size of a display area (2620). Although not recited in process 2600, an implementation may determine from operations 2610 and 2620 whether the full path is able to be displayed in the display area.

Process 2600 includes selecting a path element based on the path element's importance (2630). The element may be, for example, a search result, a parent, an interior path element, or a root, each of which can be classified in terms of relative importance. In an implementation described with FIGS. 7-15, the path elements were implicitly classified in the following decreasing order of importance: the search result, the parent, the root, and the interior path elements.

Process 2600 includes determining a meaningful portion of the selected path element (2640). A meaningful portion may be, for example, the full name, a truncated portion of the name, or an icon. Process 2600 further includes determining a part of the path to display that includes the meaningful portion (2650), and displaying the part of the path (2660).

As an example, with reference to the implementation producing screenshot 800, the implementation determines the length of SRP 720 if the full names of each path element, as well as the connectors and icons, are to be shown, as in screenshot 700 (2610). The implementation then determines the length of the available space, as determined, for example, by the width of window 705 (2620). As shown in screenshot 800, the implementation selects interior path element 750 based on interior path element 750's relative importance in the path (2630). The relative importance is low for interior path element 750, so the implementation determines a meaningful portion (2640) that is truncated from "Finder" to approximately "Finde."

The implementation then determines a part of the path to display that includes the meaningful portion of interior path element 750 (2650). The part to display also includes (i) the full name of root 730, parent 770, and search result 710, (ii) truncated and text-ramped portions of the names of interior path elements 740 and 760, (iii) all of the icons, and (iv) all of the separators. The implementation then displays the part of the path (2660).

In the above example, the implementation also selects root 730 based on root 730's relative importance in the path (2630). The relative importance for root 730, however, is high, in contrast to the relative importance of interior path element 750. Accordingly, the implementation determines a meaningful portion (2640) that includes the entire name of root 730—"babu."

The features of the various SRP implementations described herein also may be extended to other lists, particularly lists that include related elements. The elements on a list might only be related, however, in that the elements are on the same list. Path elements, in contrast, are related in that they form a logically-nested set of elements that define a navigable path for locating a document. Various other lists of elements also possess a relationship among the elements. For example, the elements in a directory listing are all related in that they have the same path, and the songs in a playlist are all related in that they will be played in order. Further, for each song in a playlist, various pieces of information are often provided, and these pieces of information are all related to the same song. These pieces of information may include, for example, a song name, a song writer, a performer, an album, a song length, and a file type. Similarly, each element in a directory listing of files or e-mails, for example, may be associated with various pieces of information about that element, such as, for example, a name, a size, a creation date, an author, and an authoring application, as applicable. Other examples include telephone directories on cell phones, in which each directory entry may contain numerous pieces of information related to a particular individual or organization.

Figure 27A:
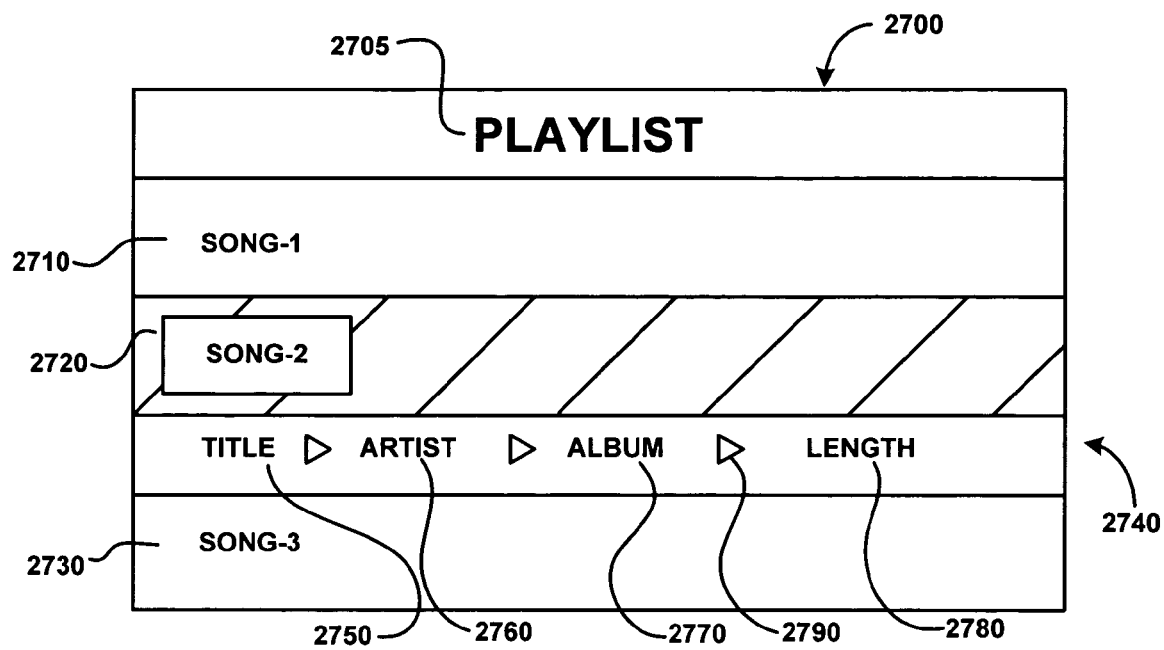
FIG. 27A is a playlist window showing a playlist of songs and related information for a particular song.

Referring to FIG. 27A, a window 2700 shows a generic playlist 2705 from a portable digital music device. The playlist 2705 includes three songs, identified as a song-1 2710, a song-2 2720, and a song-3 2730. Songs 2710-2730 may be identified using, for example, song titles or unique identifiers possibly provided by a user.

Window 2700 indicates, with cross-hatching, that song-2 2720 is selected. The selection of song-2 2720 causes information related to song-2 2720 to be displayed in a related information line 2740 below song-2 2720. The related information includes a title 2750 of song-2 2720, an artist 2760 that is performing song-2 2720, an album 2770 that includes song-2 2720, and a length 2780 indicating the length (in time) of song-2 2720. Each of the pieces of related information 2750-2780 are separated by a separator 2790.

Window 2700 may be resized by a user, and the related information may be resized in accordance with one or more of the techniques described herein. For example, an implementation may determine that length 2780 is the most important piece of information and may truncate and text-ramp information 2750-2770 to fit into related information line 2740. In another implementation, window 2700 is not resized, but information 2750-2780 is of variable length, depending, for example, on the length of a song's title, and may not fit into related information line 2740. In such a situation, one or more of the techniques described herein are used to display a portion of the information 2750-2780 in related information line 2740. Further, one or more of the techniques described herein may be used to display a portion of playlist 2705 (that is, songs 2710-2730) if window 2700 does not have enough room to display the entire playlist 2705.

Figure 27B:
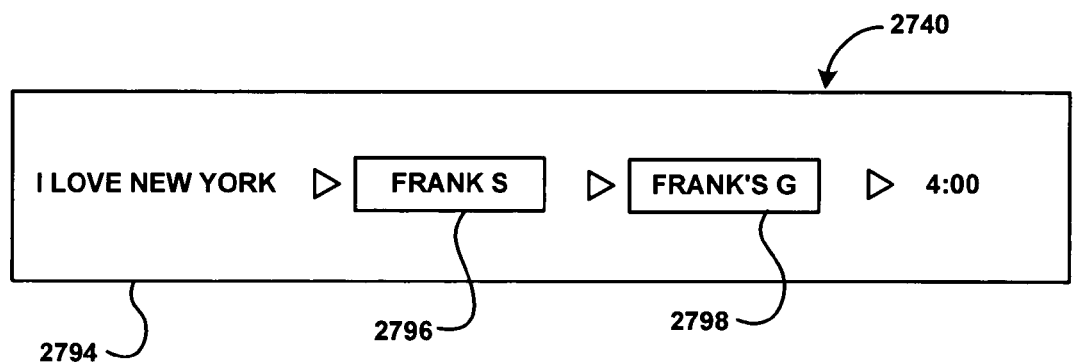
FIG. 27B displays a truncated version of the related information for the particular song of FIG. 27A.

Referring to FIG. 27B, related information 2750-2780 from window 2700 has been processed for display in related information line 2740. FIG. 27B provides an example in which title 2750 contains the song title "I Love New York," artist 2760 contains a truncated version of the singer Frank Sinatra, album 2770 contains a truncated version of an album titled "Frank's Greatest Hits," and length 2780 indicates that the length of the song "I Love New York" is four minutes. In FIG. 27B, artist 2760 and album 2770 are truncated to eliminate approximately 50% of the information in those fields. FIG. 27B also shows a related information line length 2794, an artist length 2796, and an album length 2798, as explained in the discussion of FIG. 28 below.

The features of the various implementations described herein also may be extended beyond lists to sets. A set may include multiple elements that are to be displayed in some relative orientation to each other. The elements may be resized in one, two, or three dimensions as appropriate for a given application. For example, a display of icons may be scaled, up or down, uniformly in two dimensions as a display window size is scaled. Further, three-dimensional images that include, for example, shadow, depth, or perspective may be scaled in three dimensions as a display area is resized.

The selection of which elements to resize may be based on one or more of a variety of criteria. Such criteria include, for example, the amount of information communicated by the full display of the element, the difficulty of resizing the element or of recognizing the element after resizing, the identity of the owner of the element, the contextual relevance of the element such as the relevance to a search query that generated the element as a search result, and the importance of the element to a user or other party. As an example, if a user is displaying a set of elements and the user owns, or created, one of the elements, then that element may be preferentially displayed. Selection criteria also may be supplied by a user.

The manner in which a selected element is resized may be based on the criteria used to select the element. For example, if an element is selected for preferential display because a sequence of characters occurs in the element's name, then it may be desirable to protect those characters from any truncation that is performed.

Figure 28:
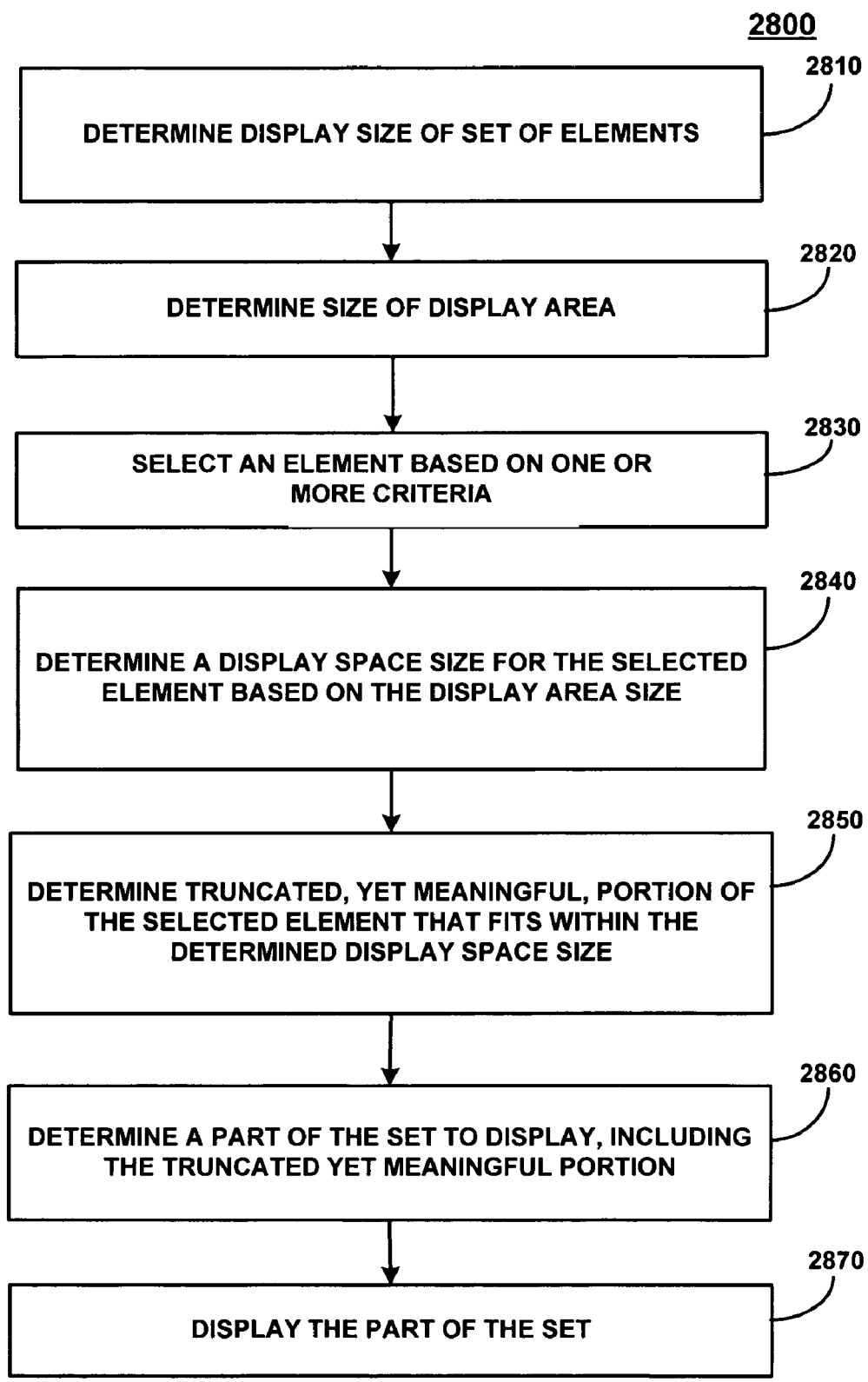
FIG. 28 is a flow chart of a process for displaying a set of elements.

Referring to FIG. 28, a process 2800 may be used to display all or part of a set of elements in a display space that may vary in size. For example, the display space may vary in the two dimensions on a screen and in three or more perceived dimensions. Further, the elements may represent one, two, or three-dimensional objects. Process 2800 may be used by a variety of applications, including, for example, the portable digital music device described with respect to FIGS. 27A-B, and the implementation producing screenshot 800 of FIG. 8.

Process 2800 includes determining a display size of a set of elements (2810), and determining a size of a display area (2820). Although not recited in process 2800, an implementation may determine from operations 2810 and 2820 whether the full set can be displayed in the display area. As discussed above, the display size of the set, or the size of the display area may be, for example, one, two, or three-dimensional. In one implementation, the set includes a list, and the size of the list varies only in length.

Process 2800 includes selecting one or more set elements based on one or more criteria (2830). The selected element(s) may include, for example, an interior path element, or a song title. Process 2800 includes determining, based on the determined size of the display area, display space sizes for each of the one or more selected elements (2840). Process 2800 then determines a truncated, yet meaningful, portion of each of the one or more selected set elements, such that the one or more truncated portions fit within the display space sizes determined for the one or more selected set elements (2850). Process 2800 further includes determining a part of the set to display that includes the truncated portion(s) (2860), and displaying the part of the set (2870). The display space sizes determined for each of the one or more selected elements may be different.

As indicated above, process 2800 may be used by the portable digital music device described with respect to FIGS. 27A-B. The device determines a display size of related information 2750-2780 (2810), and determines a size of related information line 2740 (2820). The size of related information line 2740 may be, for example, length 2794. The device may determine that the entirety of related information 2750-2780 cannot be displayed in related information line 2740, as shown in FIG. 27B.

The device then selects, for example, artist 2760 and album 2770 based on the relative importance of those two pieces of information (2830). Specifically, artist 2760 and album 2770 may be considered to have low relative importance. The device then determines a display space length for each of artist 2760 and album 2770 based on the size of related information line 2740 (2840). The two display space lengths may be, for example, length 2796 for artist 2760, and length 2798 for album 2770, as shown in FIG. 27B. The two display space lengths are too small to display artist 2760 and album 2770, respectively, in their entirety. The device determines truncated, yet meaningful, portions of artist 2760 and album 2770 that fit with the two determined display space lengths (2850). As shown in FIG. 27B, a meaningful portion of the artist name "Frank Sinatra" may be, for example, "Frank S," and a meaningful portion of the album name "Frank's Greatest Hits" may be, for example, "Frank's G."

The device then determines a part of the list to display, including the truncated portions "Frank S" and "Frank's G" (2860), and displays the part (2870). As shown in FIG. 27B, a part may consist of the full title "I Love New York," and the indicated length of the song, expressed as "4:00," in addition to the artist information "Frank S" and the album information "Frank's G."

Also as indicated above, process 2800 may be used by the search utility implementation producing screenshot 800 of FIG. 8. The search utility determines a display size of SRP 720 (2810) and determines the length of the line available for displaying SRP 720 (2820). The search utility then selects interior path elements 740-760 based on the criteria of how important it is for a user to see those elements in order to convey the path to the user (2830). The search utility then determines a display space length for the interior path elements 740-760 based on the length of the line for SRP 720 (2840). The search utility then determines a truncated, yet meaningful, portion of the interior path elements 740-760, such that the portions fit within the determined display space lengths for elements 740-760 (2850). The search utility then determines a part of SRP 720 to display that includes the truncated interior path elements 740-760, the full root 730, the full parent 770, the full name of search result 710, and all of the icons and separators (2860). The search utility then displays the determined part of SRP 720 (2870).

Note that portions of process 2800 are repeated multiple times. For example, the selection of interior path elements 740-760, followed by the determination of display space lengths and truncated portions, and followed by the determination to display the truncated portions and the display of the truncated portions, may be considered as three instantiations of operations 2830-2870.

Processes 2600 and 2800, as well as various other of the implementations, features, and techniques described herein, may be implemented largely in software by an operating system running on a computer. The software interacts with data that is to be displayed, and with information indicating the size of a display window, and with a display device such as a computer display, or a television. Firmware and hardware may be used in conjunction with, or in lieu of, software.

As is evident from the breadth of the disclosure, implementations, features, and techniques described herein, as well as variations or combinations of them, may be implemented, for example, in an operating system or in a stand-alone application or utility, running on one or more of a variety of devices.

Cell phones, personal digital assistants ("PDAs"), iPod® devices, and other portable devices provide numerous implementations because the display size is typically limited, and list information often cannot be displayed in its entirety. Implementations may provide or present a path, or other list-based information, by using text-to-speech technology or other aural techniques, or by printing. Implementations also may display a path or list, for example, by printing.

Implementations may include one or more devices configured to perform one or more processes. A device may include, for example, discrete or integrated hardware, firmware, and software. A device may include, for example, a processor, which refers to processing devices in general, including, for example, a microprocessor, an integrated circuit, a programmable logic device, and a device containing a software application.

Implementations also may be embodied in a device that includes one or more computer readable media having instructions for carrying out one or more processes. The computer readable medium may include, for example, a storage device such as, for example, a hard disk, a compact diskette, a random access memory ("RAM"), and a read-only memory ("ROM"). Instructions may be, for example, in hardware, firmware, software. Instructions may be found in, for example, an operating system, a separate application, or a combination of the two. A processor may be, for example, both a device configured to carry out a process and a device including computer readable media having instructions for carrying out a process.

Implementations also may be embodied in a software object. Such an object may be accessed by, or incorporated in, a variety of applications.

A number of implementations have been described. Nevertheless, it will be understood that various modifications may be made. For example, elements of one or more implementations may be combined, deleted, modified, or supplemented to form further implementations. Additionally, the transitions between various screenshots, such as, for example, the screenshots of FIGS. 7-15 may be performed in a forward order in which the display area size is decreasing, and a backward order in which the display area size is increasing Accordingly, other implementations are within the scope of the following claims.

What is claimed is:

1. A method comprising:
   receiving a set that includes three or more data elements, the set defining a path description where each element in the path description is related in a hierarchy, the set including an order where a first element in the set is at a highest level in the hierarchy and the last element in the set is at a lowest level in the hierarchy;

receiving information describing a size of an area in which the set is to be displayed;

determining, by a processing device, a display size of the set;

comparing, by the processing device, the size of the area with the display size of the set;

selecting a subset of at least two or more of the data elements based on a result obtained from the comparing and based on the order, the subset not including at least one of the first or the last data element in the set;

determining, by the processing device, one or more display space sizes based on the information received, each of the one or more display space sizes corresponding to one of the one or more selected data elements;

determining, by the processing device, a truncated portion for at least one of the selected data elements, the one or more portions fitting within a corresponding display space size, wherein determining a truncated portion for the selected data elements comprises, for each of the selected data elements, eliminating a predetermined non-zero percentage of a textual description of the selected data element where the predetermined non-zero percentage is less than 100%; and displaying the subset in the area including displaying the truncated portion for each of the selected data elements.

2. The method of claim 1 further comprising:

determining a part of the set to display, the part including the truncated portion of each of the one or more selected data elements; and displaying the part of the set in the area.

3. The method of claim 1 wherein the received information indicates that the area is sized such that not all of the three or more data elements can be displayed completely within the area.

4. The method of claim 1 wherein the order of the data elements is based on a relationship between the data elements.

5. The method of claim 1 wherein the order of the data elements is based on relative positions of the data elements in a display.

6. The method of claim 1 wherein the order of the data elements is based on the hierarchy among the data elements.

7. The method of claim 1 wherein the order of the data elements is based on categories represented by the data elements.

8. The method of claim 1 wherein the determined display space sizes are smaller than a full size of the corresponding selected data element and smaller than an allowable display space size for the corresponding selected data element.

9. The method of claim 1 wherein determining one or more display space sizes comprises, for each display space size to be determined:

determining the full size of a selected data element; and setting the corresponding display space size equal to approximately a predetermined percentage of the full size of the selected data element.

10. The method of claim 1 wherein the predetermined percentage is the same for each of the selected data elements.

11. The method of claim 1 wherein the set relates to a song from a playlist, and the data elements each include information about the song.

12. The method of claim 1 wherein the set relates to a path of an object on a computing device, and the data elements are each path elements.

13. A computer readable media comprising a storage device having instructions stored thereon that when executed result in at least the following:

accessing a set that includes three or more set entries, the set defining a path description where each element in the path description is related in a hierarchy, the set including an order where a first element in the set is at a highest level in the hierarchy and the last element in the set is at a lowest level in the hierarchy as compared to other data elements in the set;

accessing information describing a size of an area in which the set is to be displayed;

determining a display size of the set;

comparing, by one or more processors, the size of the area with the display size of the set;

selecting, by the one or more processors, a subset of at least two of the set entries based on a result obtained from the comparing and based on the order, the subset not including at least one of the first or the last data element in the set;

determining a size of a display area for each of the selected set entries, the size being determined based on the information accessed;

determining, by the one or more processors, a truncated portion for at least one of the selected set entries, the portions fitting within a corresponding determined display area size, wherein determining a truncated portion for the selected set entries comprises, for each of the selected set entries, eliminating a predetermined non-zero percentage of a textual description of the selected set entry where the predetermined non-zero percentage is less than 100%;

displaying the subset in the area including displaying the truncated portions for each of the selected set entries.

14. A method comprising:

selecting a subset of two or more data elements from a list of data elements, each element in the list being related in a hierarchy and including an order where a first element in the list is at a highest level in the hierarchy and the last element in the list is at a lowest level in the hierarchy relative to other data elements in the list, the subset not including at least one of the first or the last data element in the list;

determining, by a processing device, a truncated portion for each of the selected data elements, the truncated portions each having a different size, wherein determining a truncated portion for the selected data elements comprises, for each of the selected data elements, eliminating a predetermined non-zero percentage of a textual description of the selected data element where the predetermined non-zero percentage is less than 100%; and displaying the subset of data elements in an area including displaying the truncated portion for each of the selected data elements.

15. The method of claim 14 wherein the truncated portions each fit within a corresponding display space size.

16. A computer readable media comprising a storage device having instructions stored thereon that when executed result in at least the following:

selecting a subset of two or more data elements from a list of data elements, each element in the list being related in a hierarchy and including an order where a first element in the list is at a highest level in the hierarchy and the last element in the list is at a lowest level in the hierarchy relative to other data elements in the list, the subset not including at least one of the first or the last data element in the list;

determining, by a processing device, a truncated portion for each of the selected data elements, the truncated portions each having a different size, wherein determining a truncated portion for the selected data elements comprises, for each of the selected data elements, eliminating a predetermined non-zero percentage of a textual description of the selected data element where the predetermined non-zero percentage is less than 100%; and displaying the subset of data elements in an area including displaying the truncated portion for each of the selected data elements.

17. The computer readable media of claim 16 wherein the truncated portions each fit within a corresponding display space size.

* * * * *